(12) United States Patent
Davis

(10) Patent No.: US 7,083,730 B2
(45) Date of Patent: Aug. 1, 2006

(54) PRODUCTION OF PURIFIED WATER AND HIGH VALUE CHEMICALS FROM SALT WATER

(75) Inventor: Thomas A. Davis, Columbia, SC (US)

(73) Assignee: University of South Carolina, Columbia, SC (US)

(*) Notice: Subject to any disclaimer, the term of this patent is extended or adjusted under 35 U.S.C. 154(b) by 314 days.

(21) Appl. No.: 10/632,369

(22) Filed: Aug. 1, 2003

(65) Prior Publication Data

US 2004/0055955 A1    Mar. 25, 2004

Related U.S. Application Data

(63) Continuation of application No. 60/400,598, filed on Aug. 2, 2002.

(51) Int. Cl.
*B01D 61/00* (2006.01)
*G01N 57/02* (2006.01)

(52) U.S. Cl. .......... 210/652; 210/195.2; 210/175; 210/257.2; 210/180; 204/520; 204/522

(58) Field of Classification Search ........ 210/651–653, 210/180, 175, 638, 641, 257.2, 195.2; 204/520, 204/522
See application file for complete search history.

(56) References Cited

U.S. PATENT DOCUMENTS

| | | | | |
|---|---|---|---|---|
| 3,933,610 A | | 1/1976 | Ehara et al. ............... 204/180 |
| 4,036,749 A | * | 7/1977 | Anderson ................... 210/638 |
| 4,083,781 A | * | 4/1978 | Conger ....................... 210/651 |
| 4,141,825 A | | 2/1979 | Conger ......................... 210/23 |
| 4,808,287 A | | 2/1989 | Hark ........................ 204/182.5 |
| 4,999,095 A | | 3/1991 | Chlanda et al. .......... 204/182.4 |
| 5,064,505 A | | 11/1991 | Borgren ..................... 202/202 |
| 5,124,012 A | | 6/1992 | Berleyev ................. 204/180.1 |
| 5,238,574 A | * | 8/1993 | Kawashima et al. ........ 210/652 |
| 5,284,589 A | * | 2/1994 | Tegtmeyer et al. ......... 210/641 |
| 5,376,250 A | | 12/1994 | Hamano .................. 204/182.4 |
| 5,385,650 A | | 1/1995 | Howarth et al. ............ 204/103 |
| 5,458,781 A | * | 10/1995 | Lin ............................. 210/651 |
| 5,510,394 A | * | 4/1996 | Hodgdon ..................... 521/27 |

(Continued)

FOREIGN PATENT DOCUMENTS

GB          759275          10/1956

OTHER PUBLICATIONS

Abstract No. JP07047365 dated Feb. 21, 1995 entitled "Extrapure Water Producing Device.".

(Continued)

*Primary Examiner*—Ana Fortuna
(74) *Attorney, Agent, or Firm*—Nelson Mullins Riley & Scarborough, LLP

(57) ABSTRACT

Sodium chloride and purified water are recovered by treating salt water that contains sodium chloride with an integrated reverse osmosis and electrodialysis system, which includes an efficiency-enhancing feature that is one or more of the following: the use of univalent anion and univalent cation selective membranes in the electrodialysis unit; the addition of a nanofiltration unit to process the diluate from the electrodialysis unit; or operation of the electrodialysis unit at an elevated pressure. Magnesium and bromine can optionally be produced when the salt water contains these materials.

58 Claims, 8 Drawing Sheets

U.S. PATENT DOCUMENTS

| | | | | |
|---|---|---|---|---|
| 5,587,083 | A | * | 12/1996 | Twardowski ................ 210/652 |
| 5,626,904 | A | * | 5/1997 | Frederiksen ................ 426/649 |
| 5,928,853 | A | * | 7/1999 | Yamamoto ................ 430/569 |
| 6,030,535 | A | * | 2/2000 | Hayashi et al. ............ 210/652 |
| 6,187,201 | B1 | | 2/2001 | Abe et al. ................... 210/652 |
| 6,391,205 | B1 | | 5/2002 | McGinnis ................... 210/644 |
| 6,508,936 | B1 | * | 1/2003 | Hassan ....................... 210/652 |
| 6,814,865 | B1 | * | 11/2004 | Aminabhavi et al. .. 210/500.21 |
| 2002/0166758 | A1 | | 11/2002 | Vinz |

OTHER PUBLICATIONS

International Search Report dated Apr. 9, 2004 for International Application No. PCT/US03/24250.

Article from Desalination. Feb. 2003; 158; pp. 277-280 by M. Pontié et al., entitled Seawater Nanofiltration (NF): Fiction or Reality?.

Article from Desalination Apr. 1995; 103; pp. 165-176 by T. Wen et al. entitled Modelling the Cross Flow Spirally Wound Electrodialysis (SpED) Process.

Article from Desalination 1995; 101; pp. 79-91 by T. Wen et al. entitled Spirally Wound Electrodialysis (SpED) Modules.

Article from Journal of Membrane Science. May 2003; 222; 71-86 by Y. Tanaka et al. entitled Ion-exchange Membrane Electrodialytic Salt Production Using Brine Discharged from a Reverse Osmosis Seawater Desalination Plant.

Article from Desalination. Nov. 2001; 135; pp. 121-139 by M. AK. Al-Sofi entitled Seawater Desalination—SWCC Experience and Vision.

Published report by Atsushi Tomita based on the lecture titled "Salt & Chlor-Alkali Plant in Kuwait by All-membrane Process" given at the 33$^{rd}$ Electrodialysis Symposium held on Nov. 10, 1987.

Product Specification sheet for Filmtec Membranes published May 2002.

A book published by Wiley-Interscience. Aug. 1972; pp. 83-106 by Robert E. Lacey et al. entitled Industrial Processing with Materials.

Supplemental European Search Report, completed Jul. 26, 2005 dated Aug. 8, 2005 and mailed Aug. 10, 2005 for International Patent Application No. PCT/US0324250.

Abstract No. XP-002337886, Derwent Publications Ltd., London, GB; AN 2002-051490 for JP 2001 25944 A (NEC CORP) Sep. 25, 2001.

Abstract No. XP-002337887, Derwent Publications Ltd., London, GB; AN 1998-013034 for JP 09 276864 A (Toray Eng Co Ltd) Oct. 28, 1997.

Patent Abstracts of Japan, vol. 2000 No. 26, Jul. 1, 2002 European Patent Office for JP 2001 259376 A (Japan Organo Co Ltd) Sep. 25, 2001.

\* cited by examiner

PRODUCTION OF PURIFIED WATER AND HIGH VALUE CHEMICALS FROM SALT WATER

CROSS-REFERENCE TO RELATED PATENTS AND PATENT APPLICATIONS

The present application claims the benefit of U.S. Provisional Patent Application Serial No. 60/400,598, which was filed Aug. 2, 2002, and which is incorporated by reference herein in its entirety.

BACKGROUND OF THE INVENTION (1) Field of the Invention

The present invention relates to salt water desalination, and more particularly to an apparatus and process for desalination of salt water with the production of purified water and high value chemicals.

(2) Description of the Related Art

As population grows, the strain on the world's fresh water supplies will increase. By 2025, about 2.7 billion people, nearly one-third of the projected population, will live in regions facing severe water scarcity. Many prosperous and fast growing regions—the American Southwest, Florida, Asia, the Middle East—have inadequate freshwater supplies. But other factors such as a pleasant climate and mineral resources, job growth and rising incomes cause population growth nevertheless. The water needs of municipalities, industry, and citizens must be met, even as the difficulty and cost of developing new water resources increases.

Desalination has become a more popular option in regions where there is abundant water that is unsuitable for use due to high salinity, and there are opportunities for desalination plants that utilize thermal, electrical or mechanical energy to separate the water from the salts. The choice of the desalination process depends on many factors including salinity levels in the raw water, quantities of water needed, and the form of available energy.

Reverse osmosis (RO) is generally accepted as the most economical and energy-efficient method for desalination of highly saline water. See, e.g., Al-Sofi, *Desalination*, 135: 121–139 (2001). Modern RO membranes have such high salt rejection that they are capable of producing potable water, <500 ppm salinity, from seawater (nominally 35,000 ppm salinity) in a single pass through the membrane. Furthermore, some modern RO systems are capable of achieving up to 50% recovery of fresh water from seawater. With 50% recovery, the salinity of the concentrated brine increases to about 70,000 ppm. Disposal of such brines presents significant costs and challenges for the desalination industry, which result in longer start-up lead times and higher cost of water. Brine disposal to surface waters in the United States requires NPDES permits that prevent construction in certain high-demand areas. There are three basic ways to deal with brines from seawater desalination—discharge to the sea, deep well injection, and zero liquid discharge systems. The discharge of brines back into the sea can affect the organisms in the discharge area.

Evaporation and electrodialysis (ED), which are proven processes for seawater desalination, can make a brine of considerably higher concentration than can be recovered from RO, but these processes consume more energy than RO in seawater desalination.

One problem that is of concern in many desalination processes is the formation of calcium sulfate scale. In evaporation processes the high temperature at the heat exchange surfaces causes local supersaturation due to reduced solubility of calcium sulfate at elevated temperatures, even when the bulk solution is not saturated. In processes utilizing RO and nanofiltration (NF), conditions of supersaturation can exist at the membrane surface due to buildup of ion concentrations in the boundary layer. Even brackish groundwater often has enough calcium and sulfate ions to limit the amount of fresh water that can be recovered by desalination.

Seawater has many valuable constituents, but their value can only be realized if they can be recovered economically. There are ways to recover many of these valuable seawater constituents, but the economics of the recovery are often dismal because of the low concentrations of those constituents, and due to interference by other constituents of seawater.

One valuable component of seawater is sodium chloride (NaCl). Japan, for example, has no natural salt deposits, and land is too expensive there to allow the use of evaporation ponds for salt manufacture. For several decades Japan has relied on ED to recover table salt from seawater. The seawater is filtered and pumped at low velocity in a single pass through the desalting compartments of very large ED stacks. The voltage applied across membranes and solution compartments forces $Na^+$ ions through the cation permeable membrane on one side of the compartment and $Cl^-$ ions through the anion permeable membrane on the other side of the compartment. The $Mg^{++}$ ions, second most abundant cations in seawater, also migrate in the electric field, but $Mg^{++}$ passage through the cation permeable membrane is hindered by a special coating on the membrane surface. The passage of $SO_4^=$ ions is hindered by a coating on the anion permeable membrane. Thus the purity of the NaCl in the brine recovered by ED is substantially higher than the purity of brine prepared by evaporation of raw seawater. After concentration to 20% by ED, the brine is evaporated to dryness with the byproduct heat from the power plant used to generate the electricity for the ED.

Seawater is also used as the feedstock for the production of magnesium and bromine compounds. A commercial method for recovering $Mg^{++}$ is to add a base (usually lime) to seawater in order to precipitate $Mg(OH)_2$. One disadvantage that the recovery of magnesium from seawater has in comparison with magnesium recovery from magnesite is the low concentration of magnesium in the seawater. If the magnesium content of the brine feed could be increased at a reasonable cost, the production costs for magnesium would be reduced. Accordingly, this would allow manufacturers using seawater as a feedstock to compete more effectively with magnesium producers who use magnesite. Moreover, this would help alleviate the environmental damage associated with magnesite mining operations as well as the generation of the large amount of carbon dioxide incident to the processing of magnesite.

Disposal of the concentrated brine from RO plants is a major concern. The presence of dissolved salts adds to the density of water. The specific gravity (at 20° C.) of seawater (3.5% salts) is about 1.0263, and the specific gravity of high-yield RO reject (7.0% salts) is about 1.0528. If this dense RO reject were to be injected directly into the sea, it would accumulate at the bottom with a devastating effect on bottom-dwelling organisms. The greatest environmental concern associated with brine discharge to surface water relates to the potential harm that concentrate disposal may pose to bottom-dwelling organisms in the discharge area. Following the guideline that a 1000-ppm change in the salinity can be tolerated by most organisms, a given volume of 70,000 ppm brine would require dilution with 34 volumes of seawater. In some cases, that dilution can be achieved by combining the brine with another outflow such as cooling water from a power plant; otherwise an underwater structure is needed to disperse the brine. Such underwater structures are disruptive to the sea bottom, require inspection and maintenance, and are subject to damage by fishing nets, anchors or natural movements at the sea bottom.

The cost of brine disposal to the sea will vary widely depending upon site-specific circumstances. The cost of pipelines into the deep ocean, where the effects of high-salinity brine disposal are more-likely to be negligible, increase exponentially with depth. Coastal locations that are on sheltered bays or that are near estuaries, protected wetlands, and other sensitive ecosystems, are more likely to have trouble disposing of RO concentrate. Concentrate disposal problems rule out many otherwise suitable locations for industrial and municipal reverse osmosis facilities for treatment of seawater (SWRO) or brackish water (BWRO). These concentrate-disposal-constrained sites represent an important potential area for the application of Zero Liquid Discharge (ZLD) desalination. However, the high cost of commercially available ZLD technology (brine concentrators and crystallizers), and the limitations of experimental technologies such as solar ponds and dewvaporation have limited their use in SWRO and BWRO.

Other than return to the sea, the alternatives for disposal of brines from desalination plants are limited. Evaporation ponds are generally undesirable and expensive due to the cost of land. Moreover, they are useful only in climates where evaporation rates exceed rainfall. Deep well disposal is often used for hazardous wastes, and it has been used for desalination brines in Florida, but capital costs are on the order of $1 per gpd of desalination capacity. Furthermore, the applicability of deep well injection for large desalination plants is questionable because of the sheer volume of the brine and the possibility of contamination of groundwater.

Zero Liquid Discharge (ZLD) systems are widely used in other industrial situations where liquid wastes cannot be discharged. These systems usually include evaporative brine concentration followed by crystallization or spray drying to recover solids. Conventional ZLD technology involves a thermal brine concentrator and crystallizer. This technology can be used to separate SWRO concentrate into freshwater and dry salt. However, the capital costs and electrical consumption, ~$6000–$9000 per cubic meter of daily capacity and ~30 kWh per cubic meter of freshwater produced, is so high that it has not been used to achieve "zero-discharge" SWRO.

Water removal from dilute brines is usually accomplished by vapor compression or high-efficiency multiple-effect evaporators. The condensate usually has less than 10 ppm of total dissolved solids (TDS). The heat for evaporating water from saturated brines is usually provided by steam, but, even with the efficiencies of vapor recompression, the capital and operating costs of existing ZLD processes are substantial.

In contrast to the pressure-driven RO process, transport in ED is driven by electric potential. The pressure required to push water through an RO membrane is greater than the osmotic pressure, which is roughly proportional to the concentration of dissolved salts, so the necessary pressure increases as fresh water recovery increases. The limitation of the brine concentration in RO is thus determined by the practical limits of materials of construction and the energy required to pump the water to these high pressures. Since ED is electrically driven, osmotic pressures are almost inconsequential. The maximum concentration of salts in the ED brine is limited by two factors—the solubility of the salts and the amount of water that moves through the membranes along with the salt ions.

Special membranes developed for manufacture of salt from seawater in Japan have the ability to selectively pass univalent ions ($Na^+$, $K^+$, $Cl^-$, $Br^-$) while rejecting multivalent ions ($Ca^{++}$, $Mg^{++}$, $SO_4^=$). Use of these univalent-selective membranes is beneficial because the NaCl purity in the ED brine is higher and because the concentration of sparingly soluble $CaSO_4$ in the brine is substantially lower that would be the case if ordinary ion-exchange membranes were used.

In contrast with RO, the energy for salt transport by ED decreases with concentration. Desalination by RO requires about 5 kWh to produce a cubic meter of potable water compared to about 7.4 kWh for ED, which corresponds to 215 kWh per ton of salt removed by ED during desalination. However, electrical energy consumption for ED in salt manufacture is only about 150 kWh per ton of salt produced. This difference is due to the fact that the diluate (the solution from which salt has been removed in an ED unit) is more concentrated (thus more conductive) when the ED unit is being used for salt recovery than when it is used in desalination.

Despite the progress that has been made in salt water desalination, it would be useful to provide processes and equipment that efficiently recover purified water from salt water, and, in particular, to provide processes and equipment that could efficiently recover other valuable chemicals, such as high-purity sodium chloride, magnesium and bromine, in addition to purified water.

SUMMARY OF THE INVENTION

Briefly, therefore the present invention is directed to a novel method of producing purified water and sodium chloride from salt water that contains sodium chloride, the method comprising:

feeding the salt water to a reverse osmosis unit;

operating the reverse osmosis unit to separate the salt water into a permeate of purified water which is recovered and a retentate that contains sodium chloride that is concentrated with reference to the salt water;

feeding the retentate to an electrodialysis unit having a plurality of membranes, wherein at least one electrodialysis membrane is a univalent anion-selective membrane and at least one other electrodialysis membrane is a univalent cation-selective membrane;

operating the electrodialysis unit to separate the retentate into a diluate that is depleted in sodium chloride with reference to the retentate, and a concentrate that is concentrated in sodium chloride with reference to the retentate, wherein at least a portion of the diluate is recycled back to the feed to the reverse osmosis unit;

feeding the concentrate to a salt-recovery unit; and operating the salt-recovery unit to recover sodium chloride from the concentrate.

The present invention is also directed to a novel method of producing purified water and sodium chloride from salt water that contains sodium chloride, the method comprising:

feeding the salt water to a reverse osmosis unit;

operating the reverse osmosis unit to separate the salt water into a permeate of purified water which is recovered and a retentate that contains sodium chloride that is concentrated with reference to the salt water;

feeding the retentate to an electrodialysis unit having a plurality of membranes;

operating the electrodialysis unit to separate the retentate into a diluate that is depleted in sodium chloride with reference to the retentate, and a concentrate that is concentrated in sodium chloride with reference to the retentate;

feeding the diluate to a nanofiltration unit;

operating the nanofiltration unit to selectively concentrate divalent ions in the diluate into an NF retentate and to produce an NF permeate that is depleted of divalent ions with reference to the diluate, and wherein at least a portion of the NF permeate is recycled back to the feed to the reverse osmosis unit;

feeding the concentrate to a salt-recovery unit; and operating the salt-recovery unit to recover sodium chloride from the concentrate.

The present invention is also directed to a novel method of producing purified water and sodium chloride from salt water that contains sodium chloride, the method comprising:

feeding the salt water to a reverse osmosis unit;

operating the reverse osmosis unit to separate the salt water into a permeate of purified water which is recovered and a retentate that contains sodium chloride that is concentrated with reference to the salt water;

feeding the retentate to an electrodialysis unit that is designed to operate at an elevated pressure and which has a plurality of membranes;

operating the electrodialysis unit at the elevated pressure to separate the retentate into a diluate that is depleted in sodium chloride with reference to the retentate, and a concentrate that is concentrated in sodium chloride with reference to the retentate, wherein at least a portion of the diluate is recycled back to the feed to the reverse osmosis unit;

feeding the concentrate to a salt-recovery unit; and operating the salt-recovery unit to recover sodium chloride from the concentrate.

The present invention is also directed to a novel apparatus for recovering sodium chloride and purified water from salt water containing sodium chloride, the apparatus comprising:

a pump that is designed to feed salt water from a source of salt water to a reverse osmosis unit that is designed to produce a permeate of purified water and a retentate that contains sodium chloride that is concentrated with reference to the salt water, wherein the reverse osmosis unit is operatively connected to transfer the retentate to an electrodialysis unit comprising a plurality of ion-exchange membranes, wherein at least one membrane is a univalent anion-selective membrane and at least one other membrane is a univalent cation-selective membrane, and wherein the electrodialysis unit is designed to separate the retentate into a diluate that is depleted in sodium chloride with reference to the retentate, and a concentrate that is concentrated in sodium chloride with reference to the retentate, wherein the electrodialysis unit is operatively connected to transfer at least a portion of the diluate to the feed to the reverse osmosis unit, and is also operatively connected to transfer the concentrate to a salt-recovery unit that is designed to recover sodium chloride from the concentrate.

The present invention is also directed to a novel apparatus for recovery of sodium chloride and purified water from salt water containing sodium chloride, the apparatus comprising:

a pump that is designed to feed salt water from a source of salt water to a reverse osmosis unit that is designed to produce a permeate of purified water and a retentate that contains sodium chloride that is concentrated with reference to the salt water and, wherein the reverse osmosis unit is operatively connected to transfer the retentate to an electrodialysis unit which is designed to separate the retentate into a diluate that is depleted in sodium chloride with reference to the retentate, and a concentrate that is concentrated in sodium chloride with reference to the retentate, wherein the electrodialysis unit is operatively connected to transfer the concentrate to a salt-recovery unit that is designed to recover sodium chloride from the concentrate, and wherein the electrodialysis unit is operatively connected to transfer at least a portion of the diluate to a nanofiltration unit that is designed to selectively concentrate divalent ions in the diluate into an NF retentate and to produce an NF permeate that is depleted of divalent ions with reference to the diluate, and wherein the nanofiltration unit is operatively connected to recycle at least a portion of the NF permeate back to the feed to the reverse osmosis unit.

The present invention is also directed to a novel apparatus for recovery of sodium chloride and potable water from salt water comprising:

a pump that is designed to feed salt water from a source of salt water to a reverse osmosis unit that is designed to produce a permeate stream of potable water and a retentate stream that contains sodium chloride that is concentrated with reference to the salt water, and wherein the reverse osmosis unit is operatively connected to transfer the retentate to an electrodialysis unit that is designed to operate at elevated pressure and is designed to separate its feed into a diluate that is depleted in sodium chloride with reference to the feed, and a concentrate that is concentrated in sodium chloride with reference to the feed, wherein the electrodialysis unit is operatively connected to recycle at least a portion of the diluate back to the feed to the reverse osmosis unit, and wherein the electrodialysis unit is operatively connected to transfer the concentrate to a salt-recovery unit that is designed to recover sodium chloride from the concentrate.

Among the several advantages found to be achieved by the present invention, therefore, may be noted the provision of processes and equipment that efficiently recover purified water from salt water, and the provision of processes and equipment that efficiently recover other valuable chemicals, such as high-purity sodium chloride, magnesium and bromine, in addition to purified water.

Figure 1:
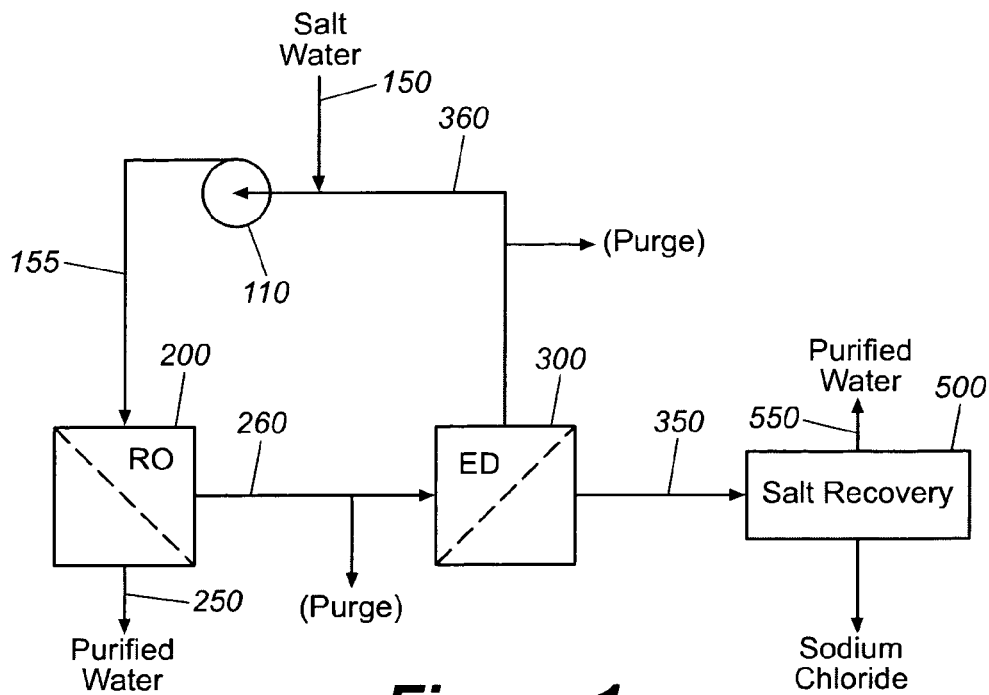
FIG. 1 is a schematic flow sheet showing an embodiment of the present apparatus comprising a reverse osmosis unit into which is fed salt water and which separates the salt water into purified water, which is recovered, and retentate that is fed to an electrodialysis unit, which separates the retentate into a concentrate, which is fed to a salt recovery unit for the production of sodium chloride, and a diluate that is recycled to the feed to the reverse osmosis unit; optional purge streams can be removed from the retentate and/or the diluate.
Figure 2:
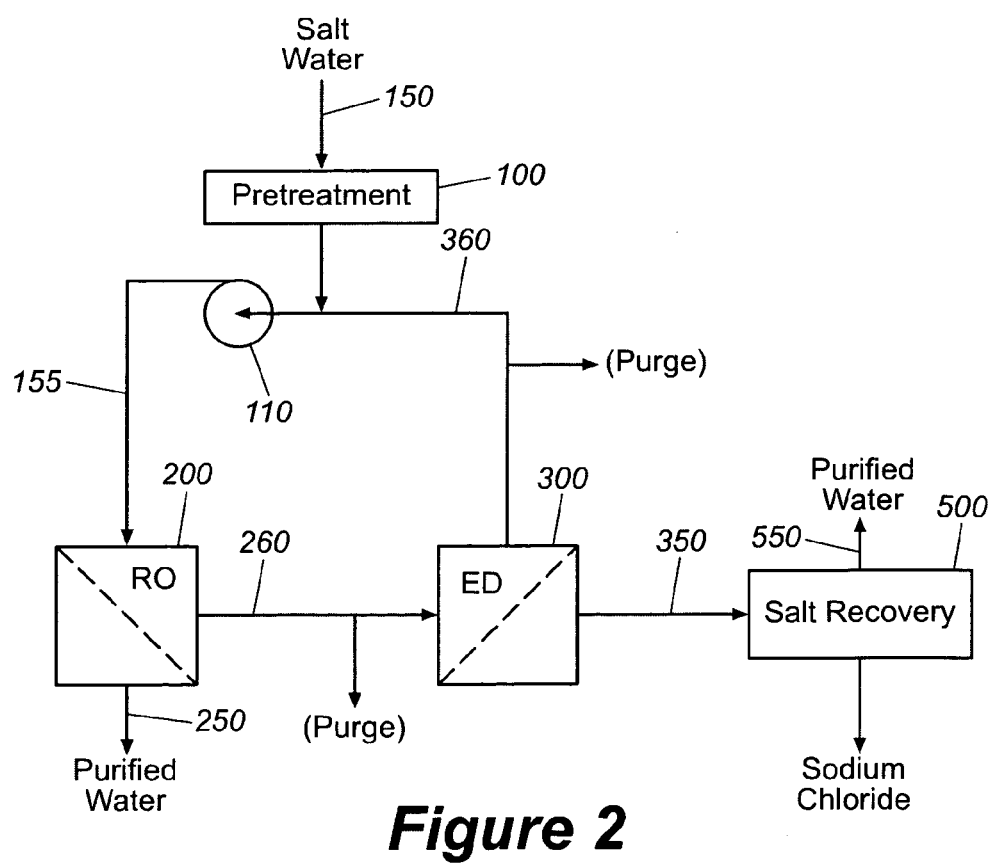
FIG. 2 is a schematic flow sheet showing an embodiment of the present apparatus comprising a pretreatment unit to treat incoming salt water prior to feeding the treated salt water to a reverse osmosis unit, which separates the salt water into purified water, which is recovered, and retentate that is fed to an electrodialysis unit, which separates the retentate into a concentrate, which is fed to a salt recovery unit for the production of sodium chloride, and a diluate that is recycled to the feed to the reverse osmosis unit; optional purge streams can be removed from the concentrate and/or the diluate.
Figure 5:
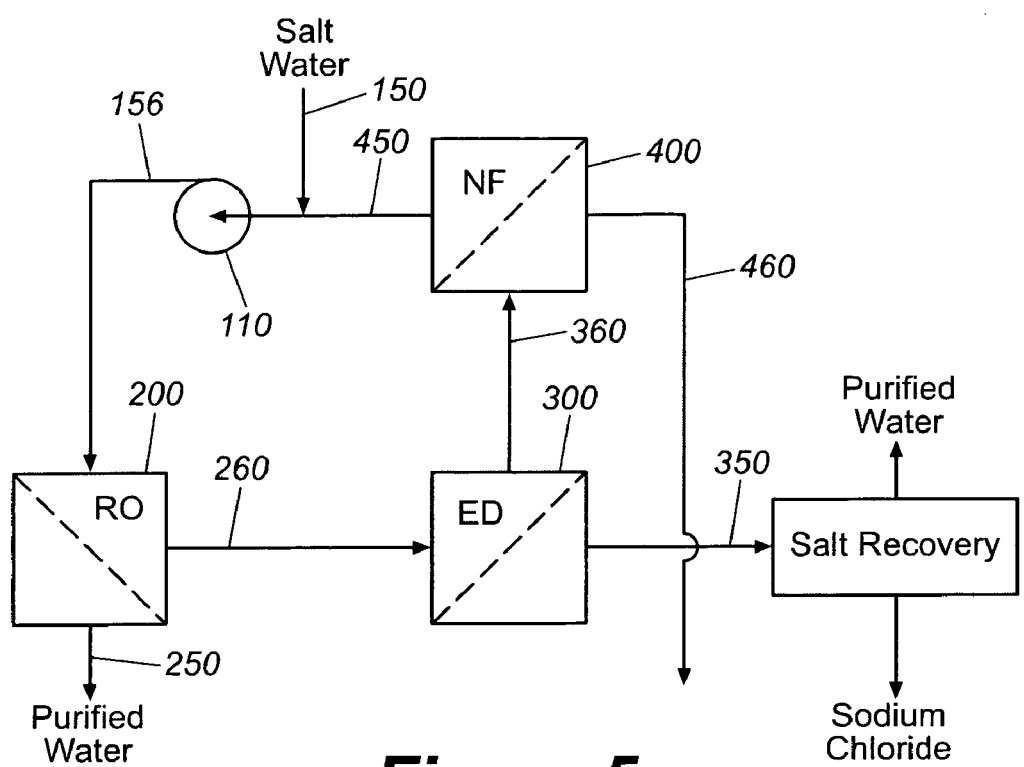
Figure 6:
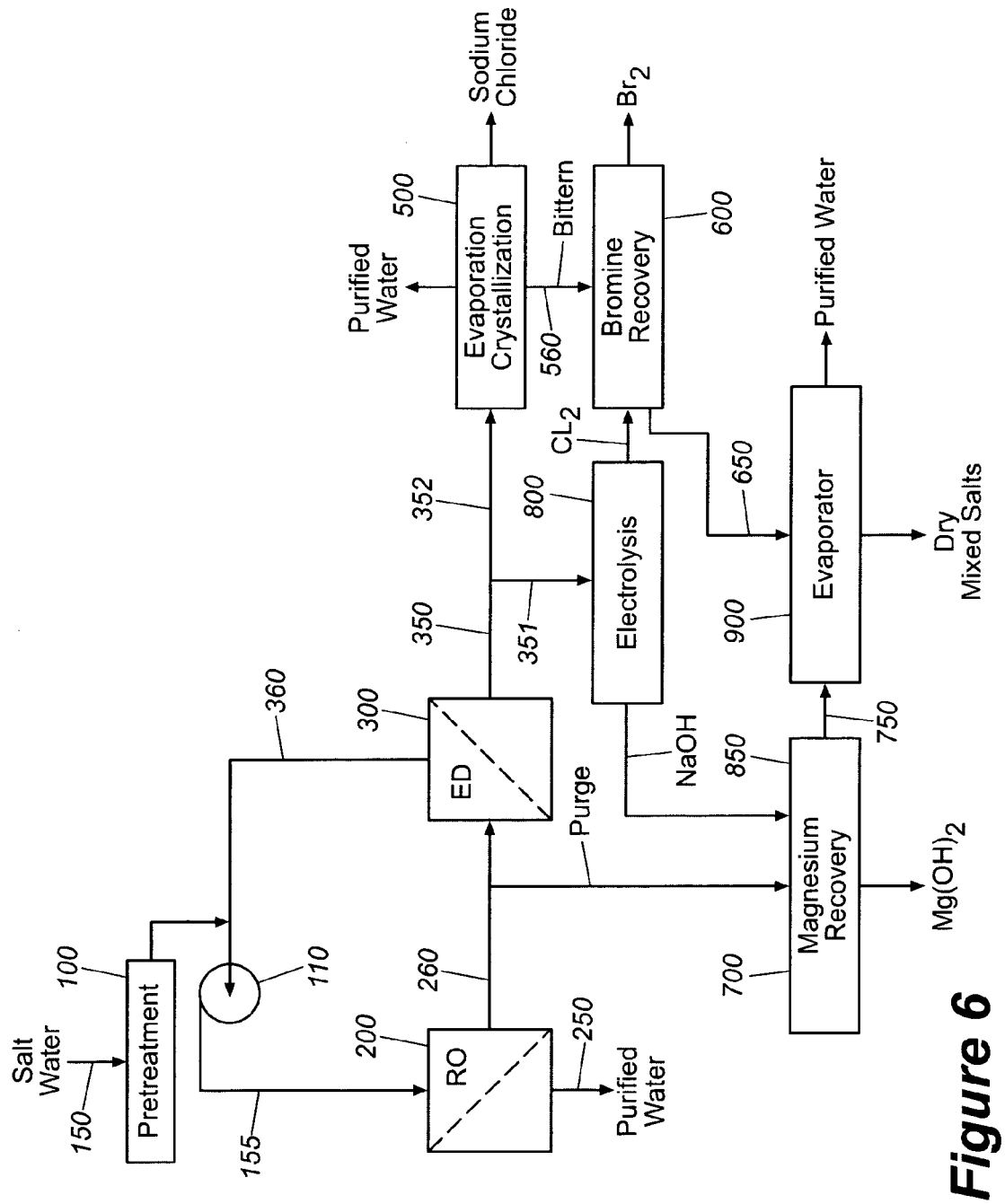
Figure 7:
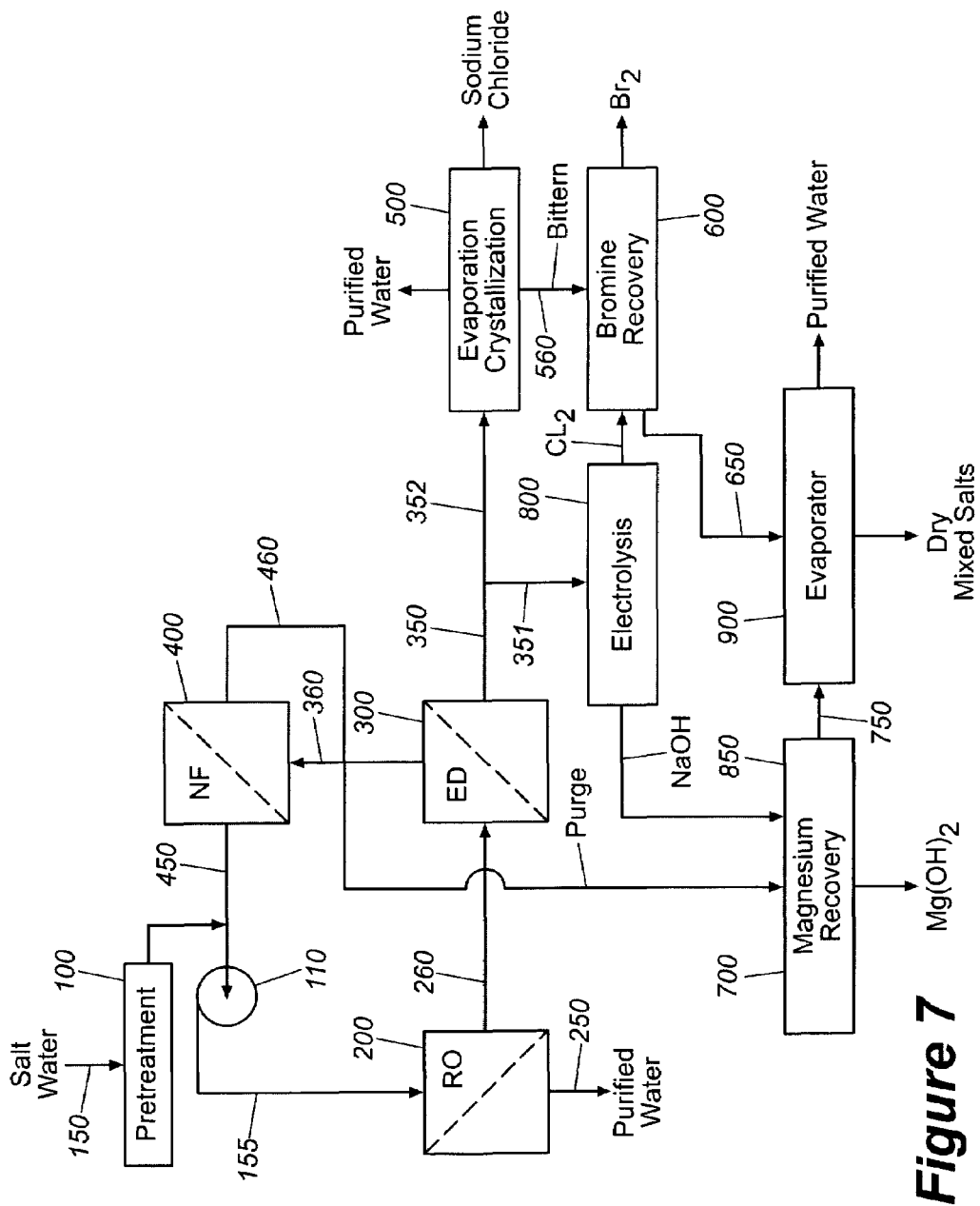

(a) retentate (260) is split into two streams (262) and (264), with (262) being fed to the ED unit between the (A) and (C) membranes, and (264) being fed between the (SA) and (SC) membranes; the stream exiting between the (A) and (C) membranes (372) is recycled by blending with the salt water (150) to make up the RO feed (155), and the stream exiting from between the (SA) and (SC) membranes (374) is fed to the magnesium recovery unit (700); the stream exiting from between the (SC) and (A) membranes (375) is split into four streams, with (261) being used as a rinse for the anode, (266) used as a rinse for the cathode, (265) being recycled to be fed between the (SC) and (A) membranes, and the remainder being fed to salt recovery; the electrode rinse streams exiting the ED unit (371) and (376) are purged from the system; the stream exiting from between the (C) and (SA) membranes (373) is split, and part is recycled to feed the ED unit between the (C) and (SA) membranes (263) and the remainder going to salt recovery;

(b) retentate (260) is split into two streams (262) and (264), with (262) being fed to the ED unit between the (A) and (C) membranes, and (264) being fed between the (SA) and (SC) membranes; the stream exiting between the (A) and (C) membranes (372) is combined with the stream exiting from between the (SA) and (SC) membranes (374) and the combined stream is recycled to make up the RO feed (155); the stream exiting from between the (SC) and (A) membranes (375) is split into four streams, with (261) being used as a rinse for the anode, (266) used as a rinse for the cathode, (265) being recycled to be fed between the (SC) and (A) membranes, and the remainder being fed to salt recovery; the electrode rinse streams exiting the ED unit (371) and (376) are purged from the system; the stream exiting from between the (C) and (SA) membranes (373) is split, and part is recycled to feed the ED unit between the (C) and (SA) membranes (263) and the remainder going to salt recovery;

(c) retentate (260) is fed to the ED unit between the (A) and (C) membranes as stream (262), and the stream exiting from between the (A) and (C) membranes (372) is recycled to the ED unit as stream (264), which is fed between the (SA) and (SC) membranes; the stream exiting between the (SA) and (SC) membranes (374) is recycled by blending with the salt water (150) to make up the RO feed (155), while the stream exiting from between the (C) and (SA) membranes (373) is split into two streams, with (263) being fed to the ED unit between the (C) and (SA) membranes and with the remainder being fed to salt recovery; the stream exiting from between the (SC) and (A) membranes (375) is split into four streams, with (261) being used as a rinse for the anode, (266) used as a rinse for the cathode, (265) being recycled to be fed between the (SC) and (A) membranes, and the remainder being fed to salt recovery; the electrode rinse streams exiting the ED unit (371) and (376) are purged from the system;

FIG. 5 is a schematic flow sheet showing an embodiment of the present apparatus comprising a reverse osmosis unit into which is fed salt water and which separates the salt water into purified water, which is recovered, and retentate that is fed to an electrodialysis unit, which separates the retentate into a concentrate, which is fed to a salt recovery unit for the production of sodium chloride, and a diluate that is fed to a nanofiltration unit that separates the diluate into an NF permeate that is recycled to the feed to the reverse osmosis unit, and an NF retentate, which can be fed to a magnesium recovery unit;

FIG. 6 is a schematic flow sheet showing an embodiment of the present apparatus comprising a pretreatment unit to treat incoming salt water prior to feeding the treated salt water to a reverse osmosis unit, which separates the salt water into purified water, which is recovered, and retentate, which is split, with part being used to feed an electrodialysis unit, which separates the retentate into a concentrate and a diluate, with the remainder of the retentate being fed to a magnesium recovery unit; the concentrate is fed to a salt recovery unit, which in this embodiment is an evaporation/crystallization system for the production of sodium chloride, purified water, and bromine-containing bittern, and the diluate is recycled to the feed to the reverse osmosis unit; part of the concentrate is fed to an electrolysis unit (800) that produces sodium hydroxide (850) for use in the magnesium recovery unit and chlorine that is used in a bromine recovery unit, which accepts the bittern (560) as its feed; an evaporator (900) recovers mixed dry salts from the spent bittern (650) from the bromine recovery unit and the spent liquid from the magnesium recovery unit; and FIG. 7 is a schematic flow sheet showing an embodiment of the present apparatus that is similar to that shown in FIG. 6, except that here the ED diluate is fed to a nanofiltration unit, which separates the diluate into an NF permeate that is recycled to make up the feed for the RO unit, and an NF retentate that replaces the RO retentate purge as the feed the magnesium recovery unit.

Corresponding reference characters indicate corresponding parts thought the several views of the drawings.

DETAILED DESCRIPTION OF THE PREFERRED EMBODIMENTS

In accordance with the present invention, it has been discovered that sodium chloride, purified water, and other valuable chemicals can be recovered from salt water, and in particular, from seawater, by subjecting the salt water to reverse osmosis (RO) to produce a permeate stream, which contains purified water, and a retentate stream that contains substantially all of the dissolved salts. The purified water is recovered for use, and the retentate contains salt in a concentration that is about twice that of the RO feed. The retentate is fed to an electrodialysis (ED) unit that separates the dissolved salts into a concentrate, which can contain salts in a concentration of up to about 20% by weight (and in a novel embodiment of the present invention the concentration can be over 20% by weight), and a diluate that is depleted in salts. At least a part of the diluate stream is recycled back to the RO feed, or it can be fed to a separate RO unit for further recovery of purified water. Sodium chloride is recovered from the concentrate from the ED unit.

It has been found that the process preferably includes an additional feature that improves its efficiency and/or effectiveness. This feature can be the use of an ED unit that employs both univalent anion-selective and univalent cation-selective membranes, or it can be the use of an ED unit that can be operated at an elevated pressure (as that term is defined below), or it can be the addition of a nanofiltration unit to selectively separate the univalent and divalent ions of the dissolved salts in the diluate into an NF permeate that selectively contains univalent ions and an NF retentate that selectively contains divalent ions. Alternatively, any two or all three of these additional features can be employed in an apparatus and method of the present invention.

Optionally, magnesium ions, which are concentrated in the diluate, can be recovered. When nanofiltration is employed in the process, the NF retentate, in which divalent ions are concentrated, can advantageously be used as a feed for magnesium recovery. The magnesium-rich feedstock from the combined RO-ED process has a unique profile that, in an era of increasingly stringent environmental regulation, could make it very important. It is a more economical feed to a magnesium recovery process than seawater, because of its higher magnesium concentration, yet it preserves the two big advantages that the use of seawater offers over the use of magnesite: limitless supply and no $CO_2$ emissions.

Sodium chloride in the concentrate can be recovered, for example, by crystallization after concentration by evaporation, and, optionally, bromide ions can be converted to bromine, either directly or indirectly by electrolysis, and recovered. Most of the bromide from seawater will appear in the concentrated brine produced by the ED and will end up in the bittern that remains after the NaCl is recovered by crystallization.

If a process that is totally free of liquid discharge is desired, the solutions remaining after the recovery of the valuable components described above can be evaporated to dryness, and the resulting dry salt would be useful, for example, for melting ice on roads.

An embodiment of the present apparatus for recovering sodium chloride and purified water from salt water containing sodium chloride can be described with reference to FIG. 1.

As used herein, "salt water" means any aqueous solution containing dissolved sodium chloride. It is preferred that the solution contain other salts in addition to sodium chloride, and magnesium and bromide salts are particularly preferred. It is also preferred that the salt water does not contain sediment, solids, biological material, organic compounds, or other contaminants. However, if such contaminants are present, it is preferred that the total amount of such materials is less that 5% by weight, less than 1% by weight is more preferred, and less than 0.1% by weight is even more preferred. Seawater is a preferred salt water for use in the present invention. Brackish water, brines, waste waters, and the like—provided they contain sodium chloride—can also serve as feed material for the present invention.

With respect to FIG. 1, a pump (110) that is designed to feed salt water (150) from a source of salt water, is operatively connected to feed a salt water feed stream (155) to a reverse osmosis unit (200) that is designed to produce a permeate (250) of purified water and a retentate (260) that contains sodium chloride that is concentrated with reference to the salt water feed stream (155), wherein the reverse osmosis unit (200) is operatively connected to transfer the retentate (260) to an electrodialysis unit (300) comprising a plurality of ion-exchange membranes, and wherein the electrodialysis unit is designed to separate the retentate (260) into a diluate (360) that is depleted in sodium chloride with reference to the retentate (260), and a concentrate (350) that is concentrated in sodium chloride with reference to the retentate (260), wherein the electrodialysis unit (300) is operatively connected to transfer at least a portion of the diluate (360) to blend with the raw salt water feed (150) to make up the salt water feed stream to the reverse osmosis unit (155). The electrodialysis unit (300) is also operatively connected to transfer the concentrate (350) to a salt recovery unit (500) that is designed to recover sodium chloride from the concentrate (350). Optionally, the salt recovery unit can also be designed to recover purified water.

As used herein, the term "pump" means any apparatus that can convey a liquid from one point to another. Preferred pumps include pressure driven liquid expulsion devices (such as a gas-pressurized container holding a liquid that can be expressed under pressure), piston pumps, peristaltic pumps, gear pumps, centrifugal pumps and diaphragm pumps. More preferred pumps are gear pumps, and single-stage and multiple-stage centrifugal pumps that are capable of developing outlet pressures suitable for the high-pressure side of a reverse osmosis unit. For example, pumps that can deliver liquid at pressures of over 500 psig are preferred, over 700 psig is more preferred, and over 900 psig is even more preferred.

When it is said that a piece of equipment, or a section of a process is "operatively connected" to another piece of equipment or a section of a process, what is meant is that the pieces of equipment are interconnected by a conduit that is suitable for transferring a process stream from the first piece of equipment to the second piece of equipment. When the process stream is a liquid, a preferred operative connection is a pipe running from the outlet of the first piece of equipment to the inlet of the second piece of equipment. In preferred embodiments, the pipe is designed to withstand the operating conditions of the particular application (e.g., the pressure and flow rate of the stream to be transferred), as well as the physical and chemical characteristics of the process stream (e.g., its corrosive nature, viscosity, chemical stability, and the like).

In the present invention, the terms "reverse osmosis" mean the separation of a solute (such as a dissolved salt) from a solution by forcing the solvent to flow through a membrane by applying pressure greater than the normal osmotic pressure. See, e.g., Chemical Engineers' Handbook, $5^{th}$ Ed., Perry and Chilton, Eds., pp.17–40–17–43, McGraw-Hill Book Co., New York (1969). In the present invention, a reverse osmosis unit must be capable of selectively separating sodium chloride from water (desalination).

Reverse osmosis units are pieces of equipment that are suitable for subjecting a liquid stream to the process of reverse osmosis. Reverse osmosis units that are suitable for desalination are readily available commercially. One example of such a unit is the AQUA WHISPER RO unit available from Sea Recovery, Carson, Calif. Examples of RO membranes that are useful in the present invention include those membranes marketed under the tradename FILMTEC SW-30, by the Dow Chemical Co., Midland, Mich.

In the present invention, the term "permeate" means the liquid that passes through the membranes of the RO unit. The permeate is purified water. As used herein, the terms "purified water" mean water having a total dissolved solids (tds) concentration of less than about 5000 ppm tds. It is more preferred that purified water have a dissolved solids concentration of less than about 2000 ppm tds, less than about 1000 ppm tds is even more preferred, and less than about 800 ppm tds is yet more preferred.

Another stream exiting the RO unit is the retentate (260). As used herein the term "retentate" means the liquid that does not pass through the membranes of the RO unit. Typically, the retentate is concentrated in dissolved salts in comparison with the reverse osmosis feed stream (155).

As used herein, the term "electrodialysis" means the process of altering the composition and/or concentration of electrolyte solutions as a result of electromigration through membranes in contact with these solutions. Electrodialysis (ED) units are commonly stacks of narrow compartments through which a feed solution is pumped. A voltage is applied across the stack by an anode at one end of the stack and a cathode at the other end. The compartments are separated by ion-exchange membranes, which are commonly arranged in order as alternating cation-exchange and anion-exchange membranes which are selectively premeable to positive and negative ions, respectively. ED units that are useful in the present invention are available commercially, and examples of such ED units are those that are available from Tokuyama Corp., Tokyo, Japan.

When it is said that the ED unit of the present invention contains a "plurality" of ion-exchange membranes, it is meant that the unit contains at least one pair of membranes comprising one anion-exchange membrane and one cation-exchange membrane. It is more preferred that the ED unit contains at least two pairs of such membranes, and four or more pairs is even more preferred.

Examples of ion-exchange membranes that are useful in the present invention include anion-exchange membranes that are marketed under the tradename NEOSEPTA and being of the grade AM-1, AMX, ACS and ACS-3, and cation-exchange membranes that are marketed under the tradename NEOSEPTA and being of grade CM-1, CMX, CMS and CIMS, all of which are available from the Tokuyama Corp., Tokyo, Japan.

In a preferred embodiment, the ED unit comprises at least one membrane that is a univalent anion-selective membrane and at least one other membrane that is a univalent cation-selective membrane. Univalent anion-selective membranes are anion-exchange membranes that selectively pass univalent anions, such as $Cl^-$ and $Br^-$, while selectively rejecting divalent anions, such as $SO_4^=$. Examples of univalent anion-selective membranes that are useful in the present invention include selective membranes that are marketed under the tradename NEOSEPTA and being of the grade ACS or ACS-3. Univalent cation-selective membranes are cation-exchange membranes that selectively pass univalent cations, such as $Na^+$ and $K^+$, while selectively rejecting divalent cations, such as $Ca^{++}$ and $Mg^{++}$. Examples of univalent cation-selective membranes are marketed under the tradename NEOSEPTA and being of grade, CMS and CIMS, all of which are available from the Tokuyama Corp., Tokyo, Japan.

The ED unit of the present invention separates the retentate stream into a concentrate and a diluate. As used herein, the term "concentrate" means the stream exiting the ED unit that has a higher concentration of dissolved salts that the retentate stream that was fed to the ED unit. The "diluate" is the stream exiting the ED unit that has been depleted in dissolved salt concentration with reference to the retentate stream that was fed to the ED unit.

In the present invention, the concentrate is fed to a salt recovery unit (500) that is designed to recover sodium chloride. The salt recovery unit can be an evaporator, a dryer, a crystallizer, a combination of an evaporator and crystallizer, or any other device or process that provides as a product concentrated brine or a dry form of sodium chloride. In a preferred embodiment, the concentrated brine is saturated. Optionally, purified water (550) can also be recovered from the salt recovery unit.

The apparatus that is described above can be used to practice the novel method of producing purified water and sodium chloride from salt water that contains sodium chloride. The method comprises feeding a salt water feed stream (155) to a reverse osmosis unit (200) and operating the reverse osmosis unit to separate the salt water into a permeate (250) of purified water which is recovered and a retentate (260) that contains sodium chloride that is concentrated with reference to the salt water feed stream (155). The retentate (260) is fed to an electrodialysis unit (300) having a plurality of membranes, and the electrodialysis unit is operated to separate the retentate (260) into a diluate (360) that is depleted in sodium chloride with reference to the retentate, and a concentrate (350) that is concentrated in sodium chloride with reference to the retentate (260), wherein at least a portion of the diluate (360) is recycled back to blend with incoming salt water (150) to make up the feed to the reverse osmosis unit (155). The concentrate (350) is fed to a salt-recovery unit (500), which is operated to recover sodium chloride from the concentrate.

Prior to entering the pump (110), the raw salt water feed stream (150) optionally can be pretreated in a pretreatment unit (100) to remove solids, organic matter, debris, and the like, or to reduce the concentration of scale-forming ions, such as calcium, if desired. The pretreatment process can be filtration to remove insoluble materials, or, optionally, prior to filtration, the concentration of calcium ions can be reduced by addition of sodium carbonate to the salt water to cause the precipitation of calcium carbonate. The salt water feed stream (150) can optionally be blended with one or more recycle streams, such as, for example streams (360) or (450), before, during, or after pretreatment, to form the feed stream to the RO unit (155).

As discussed above, the ED unit contains ion-exchange membranes, at least one of which is an anion-exchange membrane and at least one other of which is a cation-exchange membrane. In one embodiment of the present apparatus, at least one anion-exchange membrane is a univalent anion-selective membrane and at least one cation-exchange membrane is a univalent cation-selective membrane. In a preferred embodiment, every anion-exchange membrane is a univalent anion-selective membrane and every cation-exchange membrane is a univalent cation-selective membrane. One example of such a preferred embodiment is an ED unit having a stack composed of alternating NEOSEPTA ACS and NEOSEPTA CMS membranes. It has been found that when univalent ion-selective membranes are used, the ED concentrate (350) contains unexpectedly high levels of sodium chloride, such as, for example, above 20% by weight. It is preferred that the ED concentrate contain sodium chloride at a concentration that is above 21% by weight, above 22% by weight is more preferred, and above 23% by weight is even more preferred.

Figure 3:
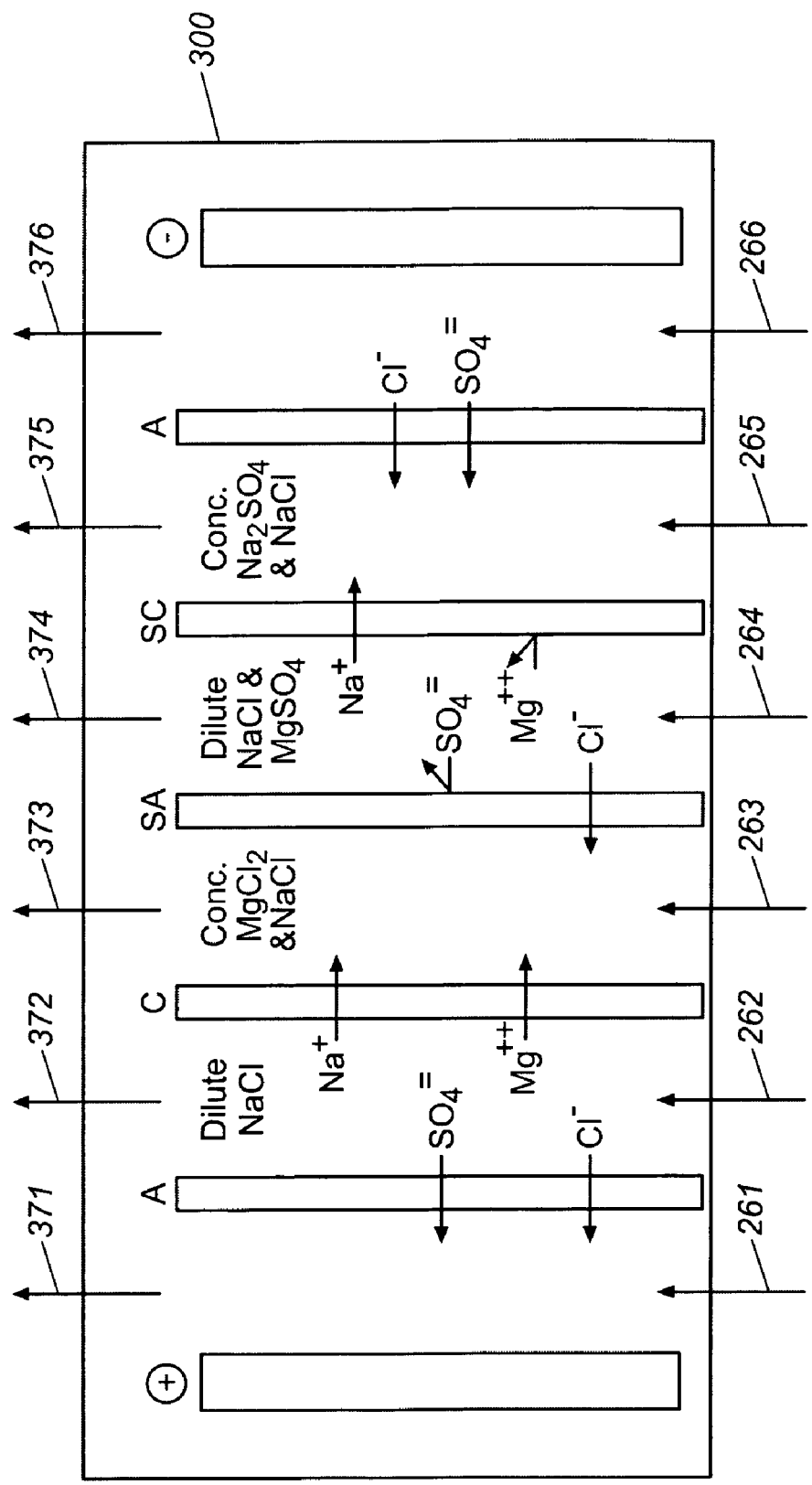
FIG. 3 is a schematic depiction of an electrodialysis unit of an embodiment of the present invention in which the ion-exchange membranes include at least one unit of four ion-exchange membranes that includes an anion-exchange membrane (A), a cation-exchange membrane (C), a univalent anion-selective membrane (SA), and an univalent cation-selective membrane (SC), in that order from the anode to the cathode.

In a preferred embodiment, the ED unit contains at least one anion-exchange membrane, at least one cation-exchange membrane, at least one univalent anion-selective membrane, and at least one univalent cation-selective membrane. A preferred embodiment is illustrated in FIG. 3, where an ED unit is depicted wherein the ion-exchange membranes are arranged in the following order from the anode (+) towards the cathode (−): anion-exchange (A), cation-exchange (C), univalent anion-selective (SA), and univalent cation-selective (SC). An ED membrane stack having the arrangement (+)/A/C/SA/SC/(−) can have as few as four membranes in the preferred order, or it can have two or more repeating units, or any fraction thereof if over one complete unit, of membranes arranged in the preferred order between the two electrodes.

FIG. 3 is illustrative of the separations that can be achieved with this membrane arrangement with $Na^+$ and $Cl^-$ being examples of univalent ions and $Mg^{++}$ and $SO_4^=$ being examples of divalent ions that can exist in the salt water being treated by the process. Different univalent and divalent anions and cations can also be present, and it is believed that they will migrate in a manner that is similar to that shown for the respective example ions.

An advantage of this arrangement is that different streams can be fed to the ED unit according to the separation that is desired. As shown in FIG. 3, streams (261), (262), (263), (264), (265), and (266) can be fed to the ED unit between each of the different membranes. Moreover, the streams that exit the ED unit from between the several membranes, namely streams (371), (372), (373), (374), (375) and (376) can be either maintained separate and routed to locations in the process where their particular compositions can be used most advantageously, or they can be selectively combined.

Figure 4A:
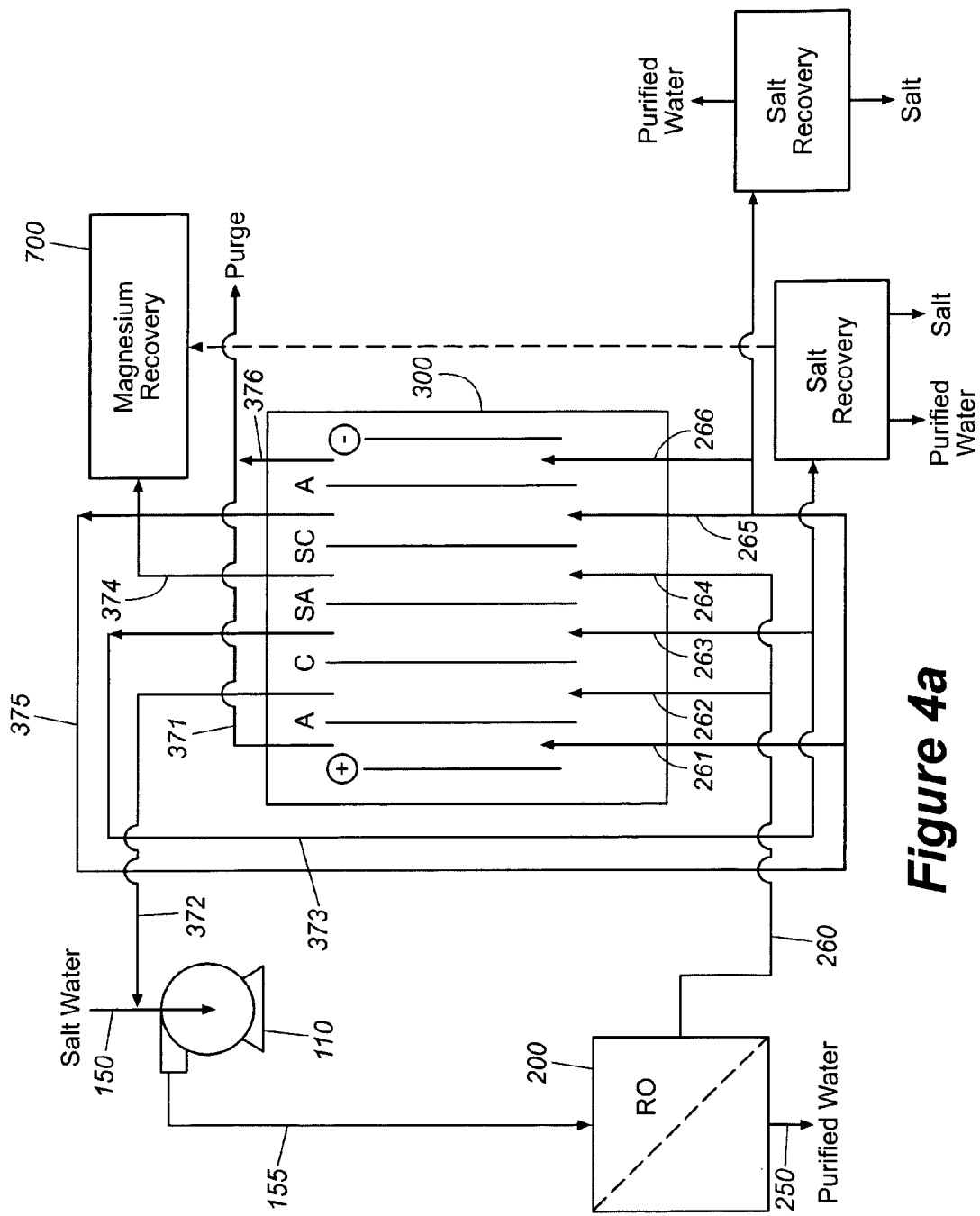
FIG. 4 shows schematic flow sheets showing several embodiments of the present apparatus in which the electrodialysis unit includes at least one unit of four ion-exchange membranes that includes an anion-exchange membrane, a cation-exchange membrane, a univalent anion-selective membrane, and an univalent cation-selective membrane, in that order from the anode to the cathode, and which show stream routing when.

An ED unit having this arrangement of membranes can be operated in any one of several flow patterns. In one embodiment, shown in FIG. 4(a), retentate (260) is split into two streams (262) and (264), with (262) being fed to the ED unit between the (A) and (C) membranes, and (264) being fed between the (SA) and (SC) membranes; the stream exiting between the (A) and (C) membranes (372) is recycled by blending with the salt water (150) to make up the RO feed (155), and the stream exiting from between the (SA) and (SC) membranes (374) is fed to the magnesium recovery unit (700); the stream exiting from between the (SC) and (A) membranes (375), which is enriched in sodium chloride and sodium sulfate, is split into four streams, with (261) being used as a rinse for the anode, (266) used as a rinse for the cathode, (265) being recycled to be fed between the (SC) and (A) membranes, and the remainder being fed to a salt recovery unit that produces sodium chloride and sodium sulfate salts; the electrode rinse streams exiting the ED unit (371) and (376) are purged from the system; the stream exiting from between the (C) and (SA) membranes (373), in which magnesium chloride and sodium chloride content is enhanced, is split, and part is recycled to feed the ED unit between the (C) and (SA) membranes (263), and the remainder going to salt recovery, where magnesium chloride can be separated to be sent to magnesium recovery (700), and sodium chloride salt can be recovered.

An alternative, which is applicable to any embodiment described herein in which the membrane arrangement shown in FIG. 3 is used, to rinsing the electrodes with portions of stream (375) is to use the common practice of rinsing the electrodes with separate rinse solutions that comprise selected solutes that provide ionic conductivity without the production of unwanted byproducts that result from the electrode reactions. Examples of selected solutes for the electrode rinse include aqueous solutions of sodium sulfate and/or sodium nitrate. Further, the electrode rinse streams can be recirculated in a feed-and-bleed mode with makeup from either stream (375) or a solution of selected soluted with makeup being supplied continuously, periodically, or as needed and with the bleed from the recirculating stream being discarded or combined with another appropriate stream in the process.

Figure 4B:
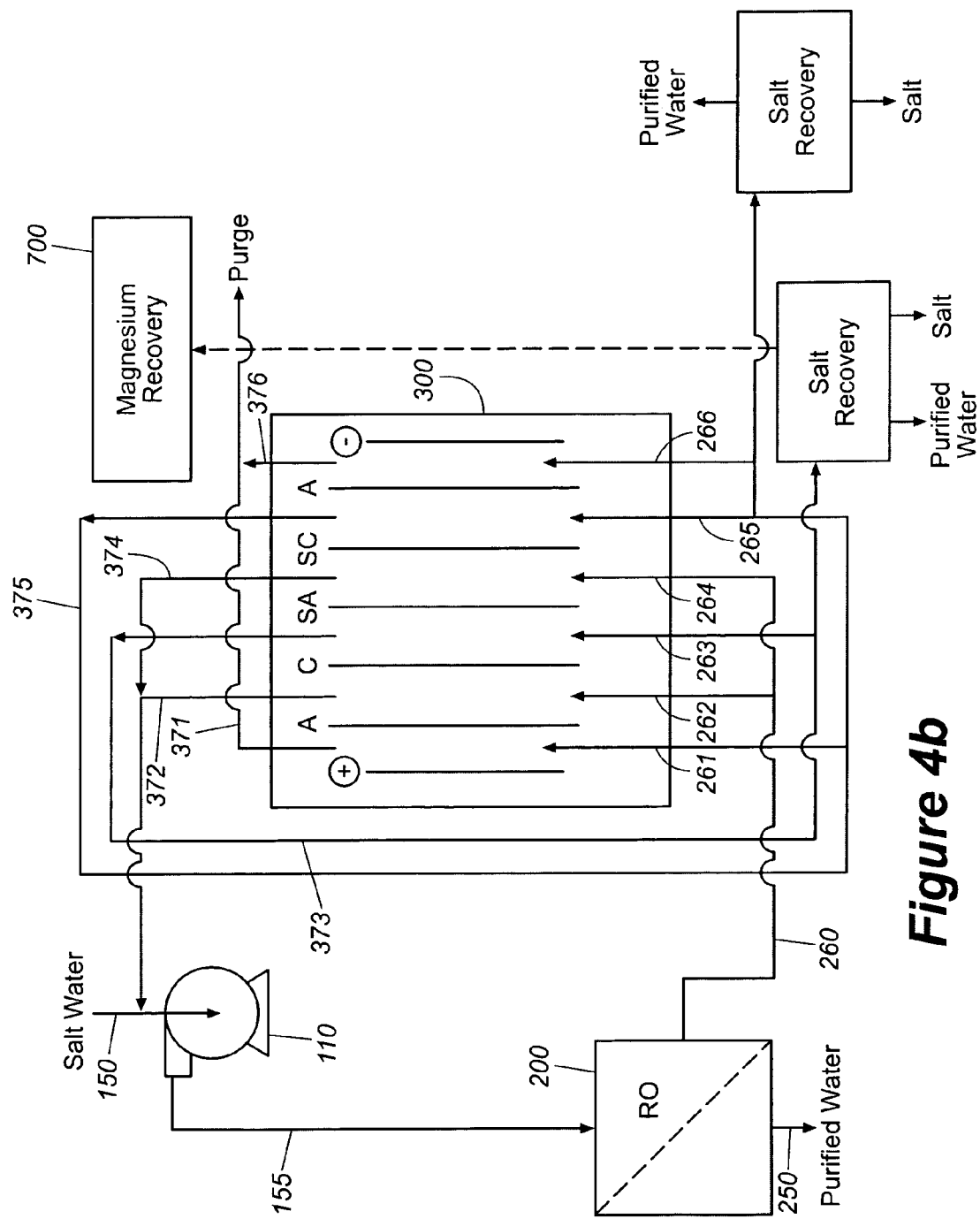

In an alternative embodiment, shown in FIG. 4(b), retentate (260) is split into two streams (262) and (264), with (262) being fed to the ED unit between the (A) and (C) membranes, and (264) being fed between the (SA) and (SC) membranes; the stream exiting between the (A) and (C) membranes (372) is combined with the stream exiting from between the (SA) and (SC) membranes (374) and the combined stream is recycled by blending with the salt water (150) to make up the RO feed (155); the stream exiting from between the (SC) and (A) membranes (375), which is enriched in sodium chloride and sodium sulfate, is split into four streams, with (261) being used as a rinse for the anode, (266) used as a rinse for the cathode, (265) being recycled to be fed between the (SC) and (A) membranes, and the remainder being fed to a salt recovery unit that produces sodium chloride and sodium sulfate; the electrode rinse streams exiting the ED unit (371) and (376) are purged from the system; the stream exiting from between the (C) and (SA) membranes (373) is split, and part is recycled to feed the ED unit between the (C) and (SA) membranes (263) and the remainder going to salt recovery, where sodium chloride salt can be recovered and magnesium chloride can be separated to be sent to magnesium recovery (700).

Figure 4C:
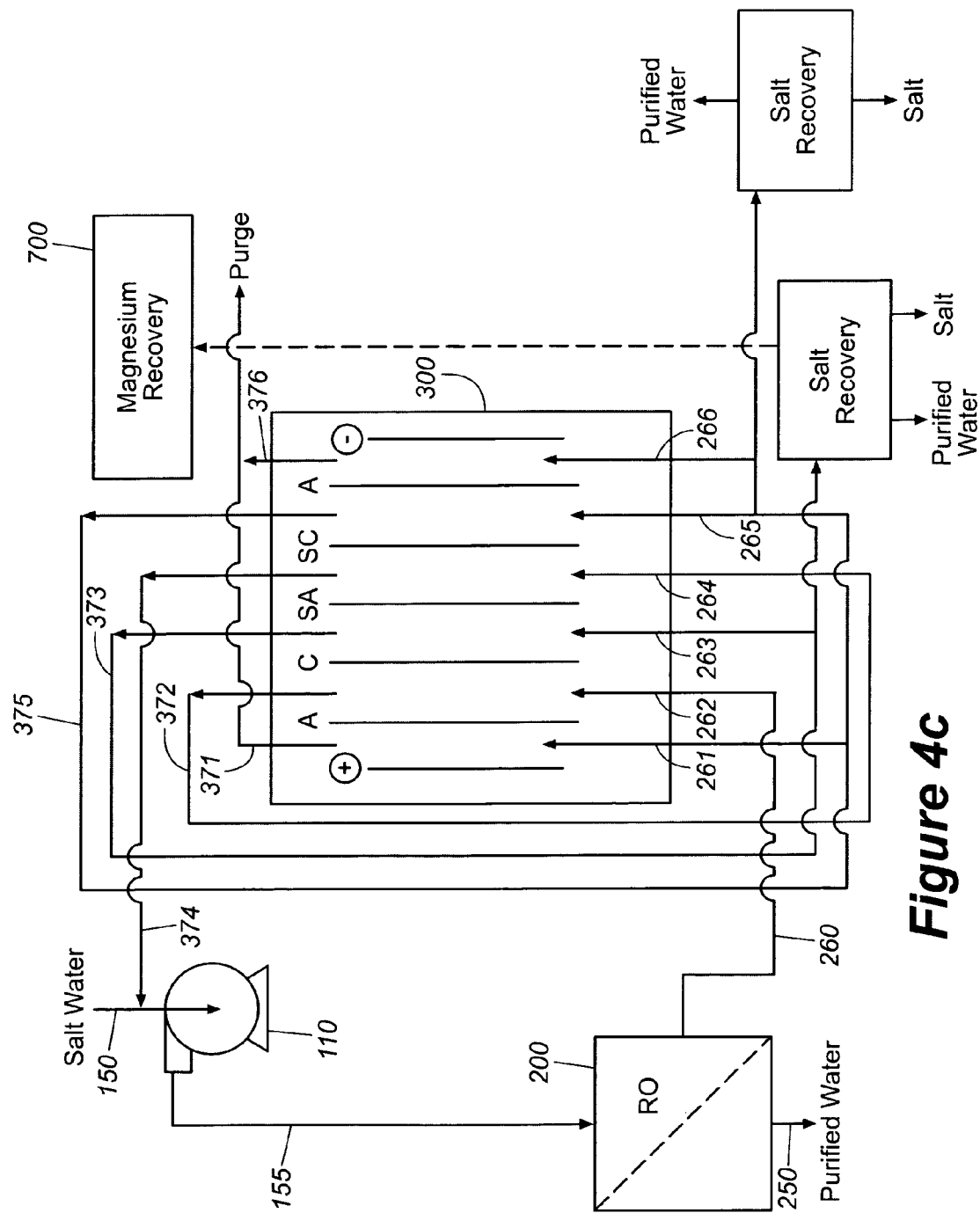

In another alternative, shown in FIG. 4(c), retentate (260) is fed to the ED unit between the (A) and (C) membranes as stream (262), and the stream exiting from between the (A) and (C) membranes (372) is recycled to the ED unit as stream (264), which is fed between the (SA) and (SC) membranes; the stream exiting between the (SA) and (SC) membranes (374) is recycled by blending with the salt water (150) to make up the RO feed (155), while the stream exiting from between the (C) and (SA) membranes (373) is split into two streams, with (263) being fed to the ED unit between the (C) and (SA) membranes and with the remainder being fed to salt recovery, where magnesium chloride can be separated to be sent to magnesium recovery (700), and sodium chloride salt can be recovered; the stream exiting from between the (SC) and (A) membranes (375) which is enriched in sodium chloride and sodium sulfate, is split into four streams, with (261) being used as a rinse for the anode, (266) used as a rinse for the cathode, (265) being recycled to be fed between the (SC) and (A) membranes, and the remainder being fed to a salt recovery unit that produces sodium chloride and sodium; the electrode rinse streams exiting the ED unit (371) and (376) are purged from the system.

U.S. Pat. Nos. 3,933,610 and 5,376,250 describe ED processes that utilize A, C, SA and SC membranes in ED stacks, but do not describe the present four-compartment repeating cell arrangement of A/C/SA/SC. U.S. Pat. No. 3,933,610 describes separate two-compartment ED stacks. One type of stack has A and SC membranes and the other type has SA and C membranes. U.S. Pat. No. 5,376,250, describes a stack with separate sections situated between a single pair of electrodes, one section with a plurality of two-compartment cells with A and SC membranes and the other section with a plurality of two-compartment cells with SA and C membranes. Furthermore, the systems described in these two patents show that the depleted solutions are recombined after exiting the ED unit, while in an embodiment of the present invention the depleted solutions are maintained separate in order to take advantage of the difference in composition of the depleted solutions, whereby the depleted solution with reduced multivalent ions (371) is more desirable for recycle to the RO feed, while the stream without reduced multivalent ions (372) is less desirable for recycle to the RO.

In another embodiment, as shown in FIG. 5, the present apparatus can include a pump (110) that is designed to feed salt water from a source of salt water to a reverse osmosis unit (200) that is designed to produce a permeate of purified water (250) and a retentate (260) that contains sodium chloride that is concentrated with reference to the salt water and, wherein the reverse osmosis unit (200) is operatively connected to transfer the retentate (260) to an electrodialysis unit (300) which is designed to separate the retentate (260) into a diluate (360) that is depleted in sodium chloride with reference to the retentate, and a concentrate (350) that is concentrated in sodium chloride with reference to the retentate, wherein the electrodialysis unit (300) is operatively connected to transfer the concentrate to a salt-recovery unit (500) that is designed to recover sodium chloride from the concentrate, and wherein the electrodialysis unit (300) is operatively connected to transfer at least a portion of the diluate (360) to a nanofiltration unit (400) that is designed to selectively concentrate divalent ions in the diluate into an NF retentate (460) and to produce an NF permeate (450) that is depleted of divalent ions with reference to the diluate, and wherein the nanofiltration unit (400) is operatively connected to recycle at least a portion of the NF permeate (450) back to the feed to the reverse osmosis unit (200).

Nanofiltration includes membrane liquid separation processes that are positioned between reverse osmosis (RO) and ultrafiltration. While RO can remove the smallest of solute molecules, in the range of 0.0001 micron in diameter and smaller, nanofiltration (NF) removes molecules in the 0.001 micron range. Nanofiltration is useful where the high salt rejection of RO is not necessary. However, NF is still capable of selectively separating water hardness elements such as calcium or magnesium. As used herein, the term "nanofiltration" means a membrane-moderated liquid separation process in which divalent ions are preferentially rejected by the NF membranes, but univalent ions are not.

Nanofiltration membranes that are useful in the present invention are available under the tradename FILMTEC NF from the Dow Chemical Co., Midland, Mich. Examples of useful NF membrane elements include elements containing FILMTEC NF200, NF270, and NF90 membranes.

Nanofiltration units are typically operated at inlet pressures that are significantly lower than those required for RO. For example, in the present invention, the ED dilutate (360), which is NF feed stream, is fed to the NF unit at a pressure between about 100 psig and 400 psig, while the feed stream to the RO unit (155) is at a pressure of above about 500 psig, and more typically above about 800 psig.

In the present invention, the NF unit separates the ED dilutate (360) into an NF retentate (460) that is concentrated in divalent ions, as compared with the dilutate, and an NF permeate (450), that is depleted in divalent ions, as compared with the diluate.

In an embodiment of the present invention where an NF unit is used, the process can be operated by feeding the salt water to a reverse osmosis unit (200), and operating the reverse osmosis unit to separate the salt water into a permeate (250) of purified water which is recovered and a retentate (260) that contains sodium chloride that is concentrated with reference to the salt water, and then feeding the retentate (260) to an electrodialysis unit (300) having a plurality of membranes, and operating the electrodialysis unit to separate the retentate (260) into a diluate (360) that is depleted in sodium chloride with reference to the retentate, and a concentrate (350) that is concentrated in sodium chloride with reference to the retentate. The diluate (360) is fed to a nanofiltration unit (400), that is operated to selectively concentrate divalent ions in the diluate into an NF retentate (460) and to produce an NF permeate (450) that is depleted of divalent ions with reference to the diluate, and wherein at least a portion of the NF permeate (450) is recycled back to the feed to the reverse osmosis unit (200). The concentrate (350) is fed to a salt-recovery unit, which is operated to recover sodium chloride from the concentrate.

The inclusion of NF separation of the ED dilutate has several advantages. Because the NF permeate (450) has been selectively depleted in divalent (scale-forming) ions, such as calcium and sulfate, the recycle of this stream to the RO unit will reduce the tendency to form calcium sulfate scale in the RO unit. Furthermore, the NF retentate (460) which has enriched levels of magnesium, is a valuable feed material for a magnesium recovery process (700), as shown in FIG. 7.

In another embodiment, the present apparatus can include an ED unit (300) that is designed to operate at elevated pressure and is designed to separate its feed (the RO retentate (260)) into a diluate (360) that is depleted in sodium chloride with reference to the feed, and a concentrate (350) that is concentrated in sodium chloride with reference to the feed.

When it is said that the ED unit is designed to operate at an elevated pressure, it is meant that the ED unit is designed to operate at a pressure that is higher than atmospheric pressure. It is preferred that the elevated pressure is a pressure that is above about 25 psig, but above about 100 psig is more preferred, above about 200 psig is even more preferred, above about 400 psig is yet more preferred, and above about 600 psig is even more preferred. Alternatively, it is preferred that the elevated pressure be about the same as the feed pressure for the NF unit, when one is used, or that it is about the same as the high-pressure side (feed side) of the RO unit.

An ED unit that can be operated at an elevated pressure (high pressure electrodialysis, or HPED) could be constructed by enclosing an ED unit in a pressure vessel. A useful configuration for an ED unit that could be placed inside a cylindrical pressure vessel would be a spirally wound ED unit as described by Wen, T. et al., *Desalination*, 101:79–91 (1995), or in British Patent No. 759,275 to Arden, V. et al. In such an apparatus, the spirally wound ED unit would be placed inside a cylindrical pressure vessel that was designed to withstand an internal pressure that was at least as high as the elevated pressure, and having inlet and outlet ports for each of the ED feed and exit streams.

An advantage of using an HPED unit is that the pressure of the RO retentate (260) would not have to be reduced prior to entering the ED unit, and then again increased for either recycle to the RO unit (200), or transfer to the NF unit (400), when one is being employed. This would reduce the requirement for repressurizing the diluate stream (360) and would reduce the energy requirement for operating the process.

In the embodiment of the present process that includes the use of an HPED unit, the process can be operated as described previously, except that the retentate (260) is fed to an electrodialysis unit (300) that is designed to operate at an elevated pressure and which has a plurality of membranes, and operating the electrodialysis unit at the elevated pressure to separate the retentate into a diluate (360) that is depleted in sodium chloride with reference to the retentate, and a concentrate (350) that is concentrated in sodium chloride with reference to the retentate, wherein at least a portion of the diluate (360) is recycled back to the feed to the reverse osmosis unit (400), either directly, or after passage through a nanofiltration unit (400) as described above.

When seawater, or any salt water that contains a magnesium salt, is used as the salt water feed to the present invention, magnesium can be recovered as an additional valuable chemical product. Several of the process streams of the present method can serve as feed streams for magnesium recovery, but an advantage of the preferred embodiments of the present invention is that they provide streams that are enriched in magnesium. These magnesium-enriched streams permit efficient magnesium recovery, which can increase the overall economic efficiency of the process.

In the present process, a process stream that contains dissolved magnesium salts is fed to a magnesium recover unit (700), which is operated to recover magnesium from the stream. It is preferred that the feed stream for the magnesium recovery unit (700) is taken as a purge stream from the RO retentate (260), as shown in FIG. 6, or from the ED diluate (360), or as all or a portion of the NF retentate (460), as shown in FIG. 7.

In an embodiment of the present invention where univalent ion-selective membranes are employed in the ED unit, divalent ions, such as magnesium, calcium and sulfate, are preferentially partitioned into the diluate (360). When the NF unit (400) employs membranes that selectively partition divalent ions (water softening membranes), then the magnesium, calcium and sulfate in the diluate (360) are preferably partitioned into the NF retentate (460). Accordingly, the NF retentate (460) is a more preferred feed stream for magnesium recovery. All, or a portion of, the NF permeate (450) can be recycled to become a part of the feed stream to the RO unit (200).

Because the NF unit is treating NaCl-depleted ED diluate (360), the concentrations of magnesium ions in the NF retentate (460) will be 4 to 8 times their concentration in the salt water feed. However, the calcium sulfate concentration, which tracks magnesium concentration, could rise to levels of supersaturation in the NF retentate. Without calcium sulfate removal, the extent to which magnesium can be concentrated by NF could be limited by scale formation.

Optionally, calcium can be removed from either the diluate (360) or the NF retentate (460) as calcium carbonate without affecting magnesium concentrations. The $CO_3^=$ can be added as $Na_2CO_3$ or as NaOH and $CO_2$. If the calcium is removed from the NF retentate (460), then all or a portion of the magnesium-rich solution could optionally be recirculated to the NF unit to build up the magnesium concentration. An additional benefit of calcium removal from the NF retentate (460) is realized when NaOH is used as the base for the precipitation of $Mg(OH)_2$. The salt in the solution remaining after precipitation would include primarily $Na_2SO_4$, which could be recovered for its commercial value.

Alternatively, the $Mg(OH)_2$ can be precipitated by the addition of lime. After lime addition and $Mg(OH)_2$ precipitation, the process stream will contain considerable $CaCl_2$, which could make it unsuitable for recycle to the main process. That stream (750) could be evaporated to produce a mixed salt for melting ice on roads, and the water from the evaporator (900) could be recovered. Such a process would be a zero-discharge system.

There are several drawbacks to the use of lime precipitation that would be eliminated by precipitation of magnesium hydroxide with NaOH. A major concern with lime addition is the large amount of $CO_2$ released to the atmosphere during the calcining of limestone to make lime. Another drawback is the potential for $CaSO_4$ precipitation. Not only would $CaSO_4$ contaminate the $Mg(OH)_2$, but it could also accumulate on the surface of the particles of lime and slow their dissolution. $CaSO_4$ contamination might be of minor concern in applications where the $Mg(OH)_2$ is dissolved in acid to make Mg salts, e.g. $MgCl_2$ or $Mg(NO_3)_2$, but it would be a problem if the $Mg(OH)_2$ were to be used to make magnesia. Accordingly, a preferred embodiment of the present invention includes the recovery of $Mg(OH)_2$ by precipitation with NaOH from an Mg-enriched solution prepared by a combined RO-ED-NF process.

The use of NaOH as the base to precipitate $Mg(OH)_2$ would reduce the problems associated with $CaSO_4$ precipitation. As a process option, a portion of the concentrate (350), which contains about 20% (or higher) NaCl, could be processed in an electrolysis unit (800) to make NaOH for precipitation of $Mg(OH)_2$ and also to make $Cl_2$, which could be used for conversion of Br ions to $Br_2$ (as will be described below). The use of NaOH would also result in a process stream after $Mg(OH)_2$ precipitation that is virtually free of calcium and, thus, would be suitable for recycle to the process after pH adjustment. Accordingly, it is a preferred embodiment of the present process to recover $Mg(OH)_2$ by precipitation from an Mg-enriched solution prepared by a combined RO-ED-NF process with NaOH derived from the ED brine by electrolysis. Furthermore, it is preferred to recycle the Mg-depleted stream back to an appropriate place in the process.

As described above, the concentrate (350) from the ED unit (300) is fed to a salt recovery unit (500), which is operated to recover a concentrated brine or dry sodium chloride. Optionally, purified water can also be recovered. In one embodiment, the salt recovery unit is an evaporator. A preferred evaporator for use in the present invention is a multiple effect vapor recompression vacuum evaporator. Concentrate (350) containing about 20% by weight salt, is fed to the evaporator, and the evaporator is operated to remove water vapor and concentrate the salt solution to its saturation point. The concentrated salt brine can be recovered and used at this point, or it can be processed further to recover dry sodium chloride and bromine.

An example of a method that can be used for the recovery of dry sodium chloride from the concentrated salt solution is crystallization. Evaporative crystallization is a preferred method for use in the present invention. When saturated salt solution is fed to a crystallizer, the products are dry salt crystals and a bittern (560). It is preferred that the crystallizer is operated under conditions that produce high purity salt that meets the specifications of vacuum pan evaporated salt and has higher-value end uses include chlor-alkalai brine, food grade and pharmaceutical grade salt, and salt for water conditioning. The crystallizer should have means of separating the high-purity salt from salt with lower-value end use such as de-icing of roads.

Evaporative crystallizers are more complex and expensive to buy and operate than evaporators. Therefore, if the ED concentrate (350) is substantially below the saturation limits for NaCl, it would be economical to remove the excess water in an evaporator before introducing the brine to the evaporative crystallizer.

Bromine is an item of commerce that can be derived from seawater. When used with univalent anion-selective membranes, the ED unit (300) will selectively remove Br⁻ ions from the RO retentate (260), because these membranes are typically selective for bromide over chloride. When the concentrate (350) is fed to an evaporative crystallization unit, the bittern (560) that results after crystallization of NaCl is richer in bromide than a bittern derived from evaporation of raw seawater. Moreover, the increase in bromide concentration, over that of the raw salt water, that is provided by RO and the ED treatment allows the recovery of bromine with lower energy consumption than recovery from raw seawater by conventional means. Accordingly, it is a preferred embodiment of the present invention to recover bromide-rich brine from seawater by a combined RO-ED process (this is the concentrate (350)). Furthermore, it is preferred to recover bromine by processing the concentrate (350) by conventional means.

$Br_2$ can be recovered from Br⁻-rich brines by a well-known method whereby $Cl_2$ gas is used to convert Br⁻ to elemental $Br_2$ that is then stripped from the brine. For simplicity the processes of Br⁻→$Br_2$ conversion and $Br_2$ recovery are shown in FIGS. 6 and 7 as a single operation that is termed a bromine recovery unit (600). An example of a bromine recovery unit can be a packed tower. Optionally, the $Br_2$ can also be made by direct electrolysis to reduce the Br⁻ ions in the bittern. Such a method is described by Howarth et al. in U.S. Pat. No. 5,385,650.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

This example shows the operation of an apparatus of the present invention to produce electrodialysis concentrates having high concentrations of sodium chloride.

A laboratory apparatus was constructed that included an Aqua Whisper 170 gallon per day (GPD) reverse osmosis (RO) unit available from Beard Marine Group, Miami, Fla., and a TS-2 electrodialysis (ED) unit (Tokuyama Corp., Tokyo) containing ten pairs of Neosepta ACS and CMS univalent-ion selective membranes (available from Tokuyama Corporation, SEC System Dept., Tokyo). Seawater (at about 3% by weight salt) was fed to the RO unit. Purified water was produced in the permeate stream from the RO unit, and the RO retentate was fed to the ED unit, which produced a diluate stream and a concentrate. The salt content of selected streams was measured with a CEM labware 9000 Moisture Analyzer, which provided an actual measurement of total dissolved solids (tds). Because substantially all of the dissolved solids in seawater are salts, the tds measurement can be substantially the same as the salt content.

When the RO feed pressure was 933 psi, the RO retentate stream contained 6.0% by weight salt. The current density to the ED unit was 46.25 mA/cm², and d-c voltage applied to the ED membrane stack was 10.7 volts. The solution temperature was 28° C. The salt concentration of the ED concentrate was 23.0% by weight.

Repeated operation of the same system under slightly different conditions of operation has resulted in ED concentrates with salt concentrations ranging from 20.25% to 24.74% by weight. It is believed that these salt concentrations are unexpected higher than the upper limit of about 20% that is described in the literature. In interpreting literature data it should be noted that it is not accurate to equate 20% by weight salt solution with a solution containing 200 g/l of salt. This is because of the difference in density of salt solutions from that of pure water. Correct translation of "% by weight" to "g/l" data can be found, for example, in the CRC Handbook, 56$^{th}$ Ed, R. C. Weast, Ed, pages D-252–253, CRC Press, Cleveland, Ohio. Accordingly, literature descriptions of ED concentrates containing 195 g/l salt would equate to about 17.3% by weight. A 20% by weight salt solution (assuming that most of the salt was sodium chloride) would contain about 229.6 g/l salt.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained. As various changes could be made in the above methods and compositions without departing from the scope of the invention, it is intended that all matter contained in the above description and shown in the accompanying drawings shall be interpreted as illustrative and not in a limiting sense.

What is claimed is:

1. A method of producing purified water and sodium chloride from salt water that contains sodium chloride, the method comprising:
   feeding the salt water to a reverse osmosis unit;
   operating the reverse osmosis unit to separate the salt water into a permeate of purified water which is recovered and a retentate that contains sodium chloride that is concentrated with reference to the salt water;
   feeding the retentate to an electrodialysis unit having a plurality of membranes, wherein at least one electrodialysis membrane is a univalent anion-selective membrane and at least one other electrodialysis membrane is a univalent cation-selective membrane;
   operating the electrodialysis unit to separate the retentate into a diluate that is depleted in sodium chloride with reference to the retentate, and a concentrate that is concentrated in sodium chloride with reference to the retentate, wherein at least a portion of the diluate is recycled back to the feed to the reverse osmosis unit;
   feeding the concentrate to a salt-recovery unit; and
   operating the salt-recovery unit to recover sodium chloride from the concentrate.

2. The method according to claim 1, wherein the salt water is seawater or is a salt water that is different than seawater and which contains sodium chloride and magnesium and bromine, or salts thereof.

3. The method according to claim 2, wherein the electrodialysis concentrate contains sodium chloride at a concentration that is higher than 20% by weight.

4. The method according to claim 2, further comprising:
removing a purge stream from either the retentate or the diluate;
feeding the purge stream to a magnesium recovery unit; and
recovering magnesium from the purge stream.

5. The method according to claim 4, further comprising:
feeding the bittern to a bromine recovery unit; and
operating the bromine recovery unit to recover bromine from the bittern.

6. The method according to claim 2, further comprising:
feeding the concentrate to a crystallization unit, optionally after concentrating the concentrate stream by evaporation; and
operating the crystallization unit to produce sodium chloride crystals and a bittern that is concentrated in bromine with respect to the stream that is fed to the crystallization unit.

7. The method according to claim 1, wherein the electrodialysis membranes further include at least one anion exchange membrane and at least one cation exchange membrane.

8. The method according to claim 7, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

9. The method according to claim 8, wherein the retentate is fed to the electrodialysis unit between the anion exchange membrane and the cation exchange membrane, and also between the univalent anion-selective membrane and the univalent cation-selective membrane, wherein the solution exiting from between the anion exchange membrane and the cation exchange membrane is recycled to the feed to the reverse osmosis unit, and wherein all or a portion of the solution exiting from between the univalent anion-selective membrane and the univalent cation-selective membrane is optionally fed to a magnesium recovery unit, and/or is recycled by blending with salt water to make up the feed stream to the reverse osmosis unit.

10. A method of producing purified water and sodium chloride from salt water that contains sodium chloride, the method comprising:
feeding the salt water to a reverse osmosis unit;
operating the reverse osmosis unit to separate the salt water into a permeate of purified water which is recovered and a retentate that contains sodium chloride that is concentrated with reference to the salt water;
feeding the retentate to an electrodialysis unit having a plurality of membranes;
operating the electrodialysis unit to separate the retentate into a diluate that is depleted in sodium chloride with reference to the retentate, and a concentrate that is concentrated in sodium chloride with reference to the retentate;
feeding the diluate to a nanofiltration unit;
operating the nanofiltration unit to selectively concentrate divalent ions in the diluate into an NF retentate and to produce an NF permeate that is depleted of divalent ions with reference to the diluate, and wherein at least a portion of the NF permeate is recycled back to the feed to the reverse osmosis unit;
feeding the concentrate to a salt-recovery unit; and
operating the salt-recovery unit to recover sodium chloride from the concentrate.

11. The method according to claim 10, wherein the salt water is seawater or is a salt water that is different than seawater and which contains sodium chloride and magnesium and bromine, or salts thereof.

12. The method according to claim 11, wherein the electrodialysis concentrate contains sodium chloride at a concentration that is higher than 20% by weight.

13. The method according to claim 11, further comprising:
removing a purge stream from either the retentate or the diluate;
feeding the purge stream to a magnesium recovery unit; and
recovering magnesium from the purge stream.

14. The method according to claim 11, further comprising:
feeding the concentrate stream to a crystallization unit, optionally after concentrating the concentrate stream by evaporation; and
operating the crystallization unit to produce sodium chloride crystals and a bittern that is concentrated in bromine with respect to the stream that is fed to the crystallization unit.

15. The method according to claim 14, further comprising:
feeding the bittern to a bromine recovery unit; and
operating the bromine recovery unit to recover bromine from the bittern.

16. The method according to claim 11, wherein the divalent ions that are selectively concentrated by the nanofiltration unit in the NF retentate comprise magnesium ions, and wherein the method further comprises:
feeding the NF retentate to a magnesium recovery unit;
operating the magnesium recovery unit to recover magnesium; and
recycling at least a part of the NF permeate to the feed to the reverse osmosis unit.

17. The method according to claim 16, further comprising:
reducing the calcium concentration in the NF retentate prior to feeding the NF retentate to the magnesium recovery unit.

18. The method according to claim 10, wherein the electrodialysis membranes include at least one univalent-anion selective membrane and at least one univalent-cation selective membrane.

19. The method according to claim 10, wherein the electrodialysis membranes include at least one anion exchange membrane, at least one cation exchange membrane, at least one univalent-anion selective membrane and at least one univalent-cation selective membrane.

20. The method according to claim 19, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

21. The method according to claim 20, wherein the retentate is fed to the electrodialysis unit between the anion exchange membrane and the cation exchange membrane, and also between the univalent anion-selective membrane and the univalent cation-selective membrane, wherein the solution exiting from between the anion exchange membrane and the cation exchange membrane is recycled to the feed to the reverse osmosis unit, and wherein all or a portion of the solution exiting from between the univalent anion-selective membrane and the univalent cation-selective membrane is optionally fed to a magnesium recovery unit, or is recycled by blending with salt water to make up the feed stream to the reverse osmosis unit.

22. The method according to claim 10, wherein the electrodialysis unit is operated at an elevated pressure.

23. The method according to claim 22, wherein the elevated pressure is optionally substantially the same as the pressure of the retentate, or is substantially the same as the pressure of the inlet of the nanofiltration unit.

24. The method according to claim 22, further comprising:
    feeding the diluate to a nanofiltration unit;
    operating the nanofiltration unit to selectively concentrate divalent ions in the diluate into an NF retentate and to produce an NF permeate that is depleted of divalent ions with reference to the diluate, and wherein at least a portion of the NF permeate is recycled back to the feed to the reverse osmosis unit;
    wherein the divalent ions that are selectively concentrated by the nanofiltration unit in the NF retentate comprise magnesium ions;
    feeding the NF retentate to a magnesium recovery unit;
    operating the magnesium recovery unit to recover magnesium; and
    recycling at least a part of the NF permeate to the feed to the reverse osmosis unit.

25. The method according to claim 24, further comprising:
    reducing the calcium concentration in the NF retentate prior to feeding the NF retentate to the magnesium recovery unit.

26. A method of producing purified water and sodium chloride from salt water that contains sodium chloride, the method comprising:
    feeding the salt water to a reverse osmosis unit;
    operating the reverse osmosis unit to separate the salt water into a permeate of purified water which is recovered and a retentate that contains sodium chloride that is concentrated with reference to the salt water;
    feeding the retentate to an electrodialysis unit that is designed to operate at an elevated pressure and which has a plurality of membranes which include at least one univalent-anion selective membrane and at least one univalent-cation selective membrane;
    operating the electrodialysis unit at the elevated pressure to separate the retentate into a diluate that is depleted in sodium chloride with reference to the retentate, and a concentrate that is concentrated in sodium chloride with reference to the retentate, wherein at least a portion of the diluate is recycled back to the feed to the reverse osmosis unit;
    feeding the concentrate to a salt-recovery unit; and
    operating the salt-recovery unit to recover sodium chloride from the concentrate.

27. The method according to claim 26, wherein the salt water is seawater or is a salt water that is different than seawater and which contains sodium chloride and magnesium and bromine, or salts thereof.

28. The method according to claim 27, further comprising:
    removing a purge stream from either the retentate or the diluate;
    feeding the purge stream to a magnesium recovery unit; and
    recovering magnesium from the purge stream.

29. The method according to claim 27, further comprising:
    feeding the concentrate to a crystallization unit, optionally after concentrating the concentrate stream by evaporation; and
    operating the crystallization unit to produce sodium chloride crystals and a bittern that is concentrated in bromine with respect to the stream that is fed to the crystallization unit.

30. The method according to claim 29, further comprising:
    feeding the bittern to a bromine recovery unit; and
    operating the bromine recovery unit to recover bromine from the bittern.

31. The method according to claim 26, wherein the electrodialysis membranes further includes at least one anion exchange membrane and at least one cation exchange membrane.

32. The method according to claim 31, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

33. The method according to claim 32, wherein the retentate is fed to the electrodialysis unit between the anion exchange membrane and the cation exchange membrane, and also between the univalent anion-selective membrane and the univalent cation-selective membrane, wherein the solution exiting from between the anion exchange membrane and the cation exchange membrane is recycled to the feed to the reverse osmosis unit, and wherein all or a portion of the solution exiting from between the univalent anion-selective membrane and the univalent cation-selective membrane is optionally fed to a magnesium recovery unit and/or is recycled by blending with salt water to make up the feed stream to the reverse osmosis unit.

34. The method according to claim 32, wherein the electrodialysis concentrate contains sodium chloride at a concentration that is higher than 20% by weight.

35. The method according to claim 24, wherein the elevated pressure is substantially the same as the pressure of the retentate, or is substantially the same as the inlet pressure of the nanofiltration unit.

36. An apparatus for recovering sodium chloride and purified water from salt water containing sodium chloride, the apparatus comprising:
    a pump that is designed to feed salt water from a source of salt water to
    a reverse osmosis unit that is designed to produce a permeate of purified water and a retentate that contains sodium chloride that is concentrated with reference to the salt water, wherein the reverse osmosis unit is operatively connected to transfer the retentate to
    an electrodialysis unit comprising a plurality of ion-exchange membranes, wherein at least one membrane is a univalent anion-selective membrane and at least one other membrane is a univalent cation-selective membrane, and wherein the electrodialysis unit is designed to separate the retentate into a diluate that is depleted in sodium chloride with reference to the retentate, and a concentrate that is concentrated in sodium chloride with reference to the retentate, wherein the electrodialysis unit is operatively connected to transfer at least a portion of the diluate to the feed to the reverse osmosis unit, and is also operatively connected to transfer the concentrate to a salt-recovery unit that is designed to recover sodium chloride from the concentrate.

37. The apparatus according to claim 36, wherein the salt water is seawater or a salt water that is different than seawater and which contains sodium chloride and magnesium and bromine, or salts thereof.

38. The apparatus according to claim 37, wherein the electrodialysis unit is designed to produce a concentrate that contains sodium chloride at a concentration of at least 20%.

39. The apparatus according to claim 37, further comprising:
an operative connection to transfer a purge stream from either the retentate or the diluate to a magnesium recovery unit; and wherein the salt recovery unit comprises:
an evaporator that is designed to further concentrate the concentrate stream to the extent that the stream is saturated in sodium chloride, and wherein the evaporator is operatively connected to a
crystallization unit that is designed to produce sodium chloride crystals and a bittern that is concentrated in bromine with respect to the stream that is fed to the crystallization unit; and
an operative connection to transfer the bittern to a bromine recovery unit that is designed to recover bromine from the bittern.

40. The apparatus according to claim 36, wherein the electrodialysis membranes further include at least one anion exchange membrane and at least one cation exchange membrane.

41. The apparatus according to claim 40, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

42. An apparatus for recovery of sodium chloride and purified water from salt water containing sodium chloride, the apparatus comprising:
a pump that is designed to feed salt water from a source of salt water to
a reverse osmosis unit that is designed to produce a permeate of purified water and a retentate that contains sodium chloride that is concentrated with reference to the salt water and, wherein the reverse osmosis unit is operatively connected to transfer the retentate to
an electrodialysis unit which is designed to separate the retentate into a diluate that is depleted in sodium chloride with reference to the retentate, and a concentrate that is concentrated in sodium chloride with reference to the retentate, wherein the electrodialysis unit is operatively connected to transfer the concentrate to
a salt-recovery unit that is designed to recover sodium chloride from the concentrate, and wherein the electrodialysis unit is operatively connected to transfer at least a portion of the diluate to
a nanofiltration unit that is designed to selectively concentrate divalent ions in the diluate into an NF retentate and to produce an NF permeate that is depleted of divalent ions with reference to the diluate, and wherein the nanofiltration unit is operatively connected to recycle at least a portion of the NF permeate back to the feed to the reverse osmosis unit.

43. The apparatus according to claim 42, wherein the salt water is seawater or a salt water that is different than seawater and which contains sodium chloride and magnesium and bromine, or salts thereof.

44. The apparatus according to claim 42, wherein the electrodialysis membranes include at least one univalent-anion selective membrane and at least one univalent-cation selective membrane.

45. The apparatus according to claim 44, wherein the electrodialysis unit is designed to produce a concentrate that contains sodium chloride at a concentration that is higher than 20% by weight.

46. The apparatus according to claim 42, wherein the electrodialysis membranes include at least one anion exchange membrane, at least one cation exchange membrane, at least one univalent-anion selective membrane and at least one univalent-cation selective membrane.

47. The apparatus according to claim 46, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

48. The apparatus according to claim 42, further comprising:
an operative connection to transfer a purge stream from either the retentate or the diluate to a magnesium recovery unit; and wherein the salt recovery unit comprises:
an evaporator that is designed to further concentrate the concentrate stream to the extent that the stream is saturated in sodium chloride, and wherein the evaporator is operatively connected to a
crystallization unit that is designed to produce sodium chloride crystals and a bittern that is concentrated in bromine with respect to the stream that is fed to the crystallization unit; and wherein the apparatus further comprises
an operative connection to transfer the bittern to a bromine recovery unit that is designed to recover bromine from the bittern.

49. The apparatus according to claim 42, wherein the divalent ions that are selectively concentrated by the nanofiltration unit in the NF retentate comprise magnesium ions, and wherein the apparatus further comprises:
an operative connection to transfer retentate to
a magnesium recovery unit that is designed to recover magnesium, and which has an operative connection to recycle at least a part of the NF permeate to the feed to the reverse osmosis unit.

50. The apparatus according to claim 42, wherein the electrodialysis unit is designed to operate at an elevated pressure.

51. The apparatus according to claim 50, wherein the elevated pressure is optionally the pressure of the retentate, or the pressure of the inlet of the nanofiltration unit.

52. An apparatus for recovery of sodium chloride and potable water from salt water comprising:
- a pump that is designed to feed salt water from a source of salt water to
- a reverse osmosis unit that is designed to produce a permeate stream of potable water and a retentate stream that contains sodium chloride that is concentrated with reference to the salt water, and wherein the reverse osmosis unit is operatively connected to transfer the retentate to
- an electrodialysis unit that is designed to operate at elevated pressure and is designed to separate its feed into a diluate that is depleted in sodium chloride with reference to the feed, and a concentrate that is concentrated in sodium chloride with reference to the feed, wherein the electrodialysis unit is operatively connected to recycle at least a portion of the diluate back to the feed to the reverse osmosis unit, wherein the electrodialysis membranes include at least one univalent-anion selective membrane and at least one univalent-cation selective membrane; and wherein the electrodialysis unit is operatively connected to transfer the concentrate to
- a salt-recovery unit that is designed to recover sodium chloride from the concentrate.

53. The apparatus according to claim 52, wherein the salt water is seawater or a salt water that is different than seawater and which contains sodium chloride and magnesium and bromine, or salts thereof.

54. The apparatus according to claim 53, further comprising:
- an operative connection to transfer a purge stream from either the retentate or the diluate to a magnesium recovery unit; and wherein the salt recovery unit comprises:
- an evaporator that is designed to further concentrate the concentrate stream to the extent that the stream is saturated in sodium chloride, and wherein the evaporator is operatively connected to a
- crystallization unit that is designed to produce sodium chloride crystals and a bittern that is concentrated in bromine with respect to the stream that is fed to the crystallization unit; and wherein the apparatus further comprises an operative connection to transfer the bittern to a
- bromine recovery unit that is designed to recover bromine from the bittern.

55. The apparatus according to claim 52, wherein the electrodialysis membranes further include at least one anion exchange membrane and at least one cation exchange membrane.

56. The apparatus according to claim 55, wherein the electrodialysis unit comprises an anode and a cathode and wherein at least four adjacent electrodialysis membranes are arranged in the following order from the anode to the cathode: anion exchange, cation exchange, univalent anion-selective, and univalent cation-selective, wherein the order can be optionally repeated in whole or in part within the plurality of electrodialysis membranes.

57. The apparatus according to claim 52, wherein the elevated pressure is substantially the same as the pressure of the retentate exiting the reverse osmosis unit.

58. The apparatus according to claim 52, wherein the electrodialysis unit is operatively connected to transfer at least a portion of the diluate to a nanofiltration unit that is designed to operate at an inlet pressure to selectively concentrate divalent ions in the diluate into an NF retentate and to produce an NF permeate that is depleted of divalent ions with reference to the diluate, and wherein the nanofiltration unit is operatively connected to recycle at least a portion of the NF.

* * * * *